United States Patent
Otani et al.

(10) Patent No.: US 12,265,865 B2
(45) Date of Patent: Apr. 1, 2025

(54) IMAGE PROCESSING APPARATUS, THRESHOLD MATRIX GENERATION APPARATUS, CONTROL METHODS THEREFOR, RECORDING APPARATUS, AND NON-TRANSITORY COMPUTER-READABLE STORAGE MEDIUM

(71) Applicant: CANON KABUSHIKI KAISHA, Tokyo (JP)

(72) Inventors: Ryosuke Otani, Tokyo (JP); Shoei Moribe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/339,435

(22) Filed: Jun. 22, 2023

(65) Prior Publication Data

US 2024/0005119 A1  Jan. 4, 2024

(30) Foreign Application Priority Data

Jul. 1, 2022 (JP) ................................ 2022-107356

(51) Int. Cl.
*G06K 15/02* (2006.01)
*G06K 15/10* (2006.01)
*G06T 7/00* (2017.01)
*G06T 7/90* (2017.01)

(52) U.S. Cl.
CPC ....... *G06K 15/1878* (2013.01); *G06K 15/102* (2013.01); *G06K 15/1881* (2013.01); *G06T 7/0004* (2013.01); *G06T 7/90* (2017.01); *G06T 2207/30144* (2013.01)

(58) Field of Classification Search
CPC ............ G06K 15/1878; G06K 15/102; G06K 15/1881; G06T 7/90; G06T 7/0004; G06T 2207/30144
USPC ....................................... 358/3.06, 1.9, 1.15
See application file for complete search history.

(56) References Cited

U.S. PATENT DOCUMENTS

| | | | |
|---|---|---|---|
| 10,769,506 | B2 | 9/2020 | Doi |
| 10,771,657 | B2 | 9/2020 | Doi |
| 11,003,965 | B2 | 5/2021 | Moribe |
| 11,407,231 | B2 | 8/2022 | Moribe |
| 11,679,599 | B2 | 6/2023 | Moribe |
| 2009/0310161 | A1* | 12/2009 | Kawamura .......... H04N 1/4052 358/1.9 |

(Continued)

FOREIGN PATENT DOCUMENTS

JP 2016-163197 A 9/2016

OTHER PUBLICATIONS

U.S. Appl. No. 18/338,740, filed Jun. 21, 2023 by Ryosuke Otani.

*Primary Examiner* — Quang N Vo
(74) *Attorney, Agent, or Firm* — VENABLE LLP

(57) ABSTRACT

An image processing apparatus inputs a plurality of multi-valued data corresponding to a plurality of color materials, and quantizes each of the plurality of multi-valued data and generate a plurality of quantization data each indicating recording or non-recording of a dot on a recording medium by each of the plurality of color materials. A plurality of dot patterns of the plurality of color materials recorded based on the plurality of quantization data generated have peaks at different deviation angles in power spectra in a frequency domain and have blue noise characteristic or a green noise characteristic.

8 Claims, 13 Drawing Sheets

(56) References Cited

U.S. PATENT DOCUMENTS

2011/0063642 A1\* 3/2011 Greim ................ H04N 1/32203
358/1.9

\* cited by examiner

IMAGE PROCESSING APPARATUS, THRESHOLD MATRIX GENERATION APPARATUS, CONTROL METHODS THEREFOR, RECORDING APPARATUS, AND NON-TRANSITORY COMPUTER-READABLE STORAGE MEDIUM

BACKGROUND OF THE INVENTION

Field of the Invention

The present invention relates to an image processing apparatus, a threshold matrix generation apparatus, control methods therefor, a recording apparatus, and a non-transitory computer-readable storage medium.

Description of the Related Art

An image forming apparatus such as a printer that prints, using a recording material, on a recording medium, an image represented by digital image data input via a computer or a digital camera is widely used. The digital image data generally represents the pixel values of pixels forming the image data by many tones of 8 bits or 16 bits per color. On the other hand, since the image forming apparatus forms an image in accordance with ON/OFF of dots by the recording material, the number of tones that can be output by the image forming apparatus is often smaller than that of the image data. To cope with this, in general, to print a multi-tone image by the image forming apparatus, halftone processing is performed for the digital image data. Halftone image data obtained by the halftone processing represents a dot pattern to be output onto the recording medium by the image forming apparatus, and represents the tones of the image in a pseudo manner.

As a kind of halftone processing, there is a method called dither processing using a threshold matrix. The threshold matrix is a matrix in which thresholds are two-dimensionally arranged. The dither processing quantizes the pixel value of each pixel by comparing the pixel value with the corresponding threshold for each pixel forming the image data, thereby reducing the number of tones of the image data. The threshold matrix is repeatedly arranged on the entire image data in a tile pattern and set so that the thresholds correspond to all the pixels. The threshold matrix used for the dither processing is classified into two types. One is a dot-concentrated threshold matrix for an Amplitude Modulation (AM) method, in which thresholds are arranged to increase sequentially from a given position. The other is a dot dispersion threshold matrix for a Frequency Modulation (FM) method, in which large and small thresholds are dispersed and arranged.

In the AM method, a stable tone output is obtained but in color printing, a moiré effect easily appears due to overlapping of colors of C, M, Y, and K. In general, in a printing technique, the frequency of moiré occurring between the colors is shifted to the high frequency side by changing a screen angle for each color, thereby preventing moiré from being visually conspicuous. For example, by setting 30° as a center and assigning screen angles of 0° and 60° to dot patterns of respective colors, occurrence of moiré caused by overlapping of the colors is suppressed. As described above, by changing the screen angle for each color, it is possible to reduce occurrence of moiré. However, in the AM method, since the reproducibility of a high-frequency input image is low and the dots are arranged regularly, jaggies appear in an image edge portion. Furthermore, even if moiré is suppressed by introducing the screen angles, a regular pattern called a Rosette pattern generated by overlapping of colors is generated.

As an approach for avoiding the above problems, there is provided a tone expression method by the FM method, such as a blue noise mask method or a green noise mask method of exhibiting a highly dispersible frequency characteristic in which there is no peak at a specific angle and a low frequency range is reduced. Since these methods have a frequency characteristic showing a high-frequency pattern with a high dot dispersibility, they are widely used for a halftone screen in digital printing having high responsiveness with respect to a high-frequency pattern, an inkjet printer, a thermal transfer printer, or the like. However, in the FM method, while moiré caused by overlapping of colors is difficult to occur because of an acyclic structure, low-frequency components generated by interference of frequency components in a high-frequency band may appear in a form of "graininess", thereby degrading image quality.

Japanese Patent Laid-Open No. 2016-163197 describes a technique of suppressing, by changing a band in the frequency domain for each color, low-frequency components generated by overlapping of colors.

SUMMARY OF THE INVENTION

One aspect of the present invention provides a technique of suppressing occurrence of moiré, graininess, and the like caused by overlapping of dots of a plurality of colors at the time of forming an image on a recording medium by the dots of the plurality of colors.

According to one aspect of the present invention, there is provided an image processing apparatus comprising: an input unit configured to input a plurality of multi-valued data corresponding to a plurality of color materials; and a quantization unit configured to quantize each of the plurality of multi-valued data and generate a plurality of quantization data each indicating recording or non-recording of a dot on a recording medium by each of the plurality of color materials, wherein a plurality of dot patterns of the plurality of color materials recorded based on the plurality of quantization data generated by the quantization unit have peaks at different deviation angles in power spectra in a frequency domain and have a blue noise characteristic or a green noise characteristic.

Further features of the present invention will become apparent from the following description of exemplary embodiments with reference to the attached drawings.

DESCRIPTION OF THE EMBODIMENTS

Figure 1:
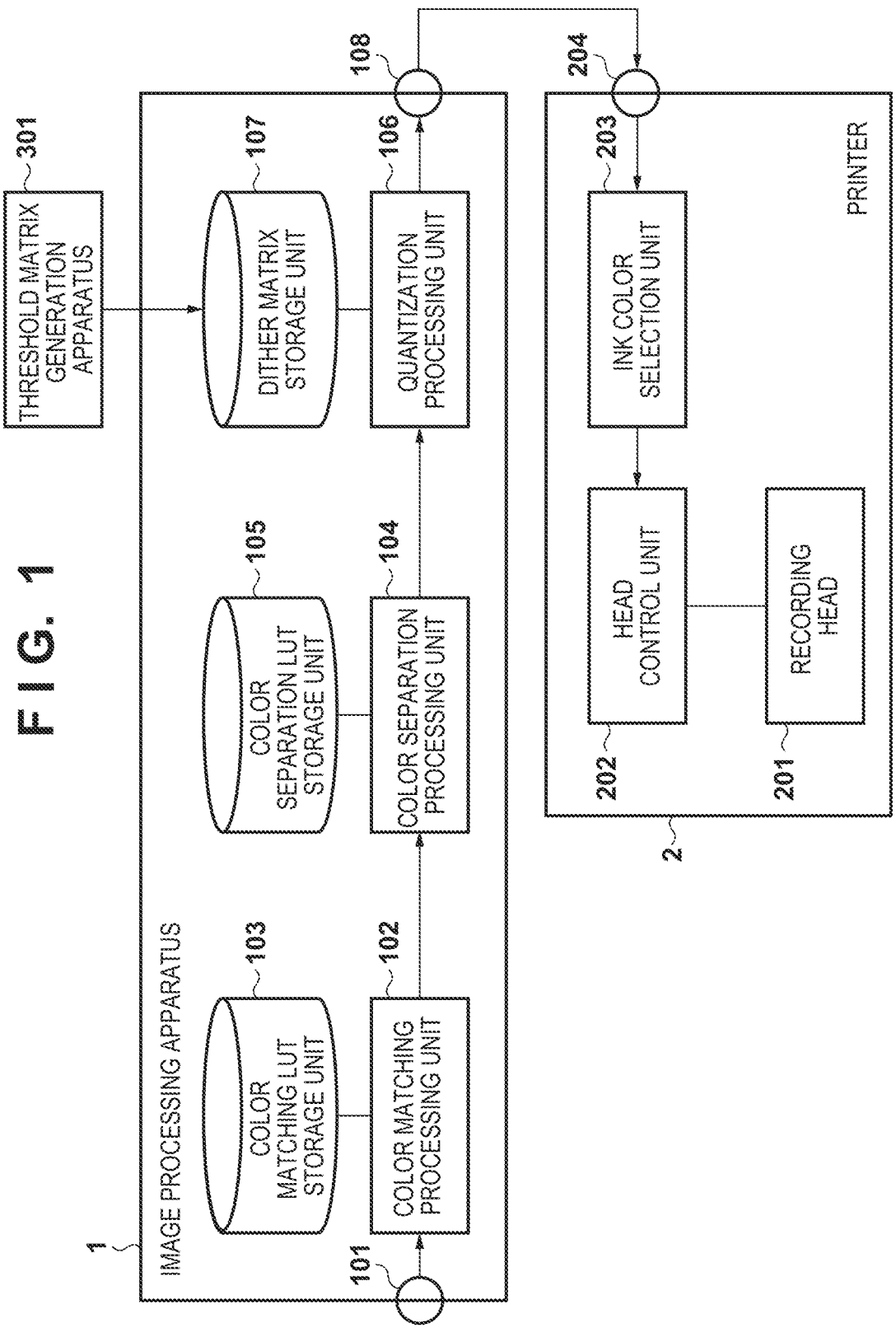
FIG. 1 is a block diagram showing an example of the arrangement of an image forming system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Moiré or granular frequency components generated by overlapping of colors appear in the frequency band of convolution of frequency components of the respective colors. Therefore, like the technique described in Japanese Patent Laid-Open No. 2016-163197, it is possible to suppress interference with the ultra-low frequency band (near the zero frequency) by changing the band for each color. However, if the bands of the colors are relatively close to each other, it is impossible to sufficiently suppress aliasing into the low frequency range due to convolution in each band. On the other hand, if the bands of the colors are kept away from each other to suppress interference with the low frequency range, a feeling of uniformity degrades due to the difference between the frequency bands of the colors.

First Embodiment (Apparatus Arrangement)

FIG. 1 is a block diagram showing the arrangement of an image forming system according to this embodiment. The image forming system of this embodiment includes an image processing apparatus 1 and a printer 2. The image processing apparatus 1 can be implemented by, for example, a printer driver installed on a general personal computer. In this case, each unit of the image processing apparatus 1 to be described below is implemented when the computer executes a predetermined program. As another arrangement, for example, the printer 2 may include the image processing apparatus 1.

The image processing apparatus 1 and the printer 2 are connected by a printer interface or a circuit. The image processing apparatus 1 obtains print target image data from an image data input terminal 101. In this embodiment, the image data is an 8-bit RGB color image. A color matching processing unit 102 performs color matching processing for the input RGB image data to correct the color of the RGB image. With the color matching processing, even if a recording medium or a printer having a different color reproduction characteristic is used, uniform color reproduction can be obtained. In the color matching processing, the color matching processing unit 102 refers to a three-dimensional color matching LUT stored in a color matching LUT storage unit 103. In the color matching LUT, RGB values are described on thinned lattice points of 17×17×17 points, and values between the lattice points are calculated by linear interpolation.

A color separation processing unit 104 generates, from the image data corrected by the color matching processing unit 102, 8-bit ink value images of four planes corresponding to four color inks provided in the printer 2. In this embodiment, the printer 2 mounts four color inks of cyan (C), magenta (M), yellow (Y), and black (K) on a recording head 201. In color separation processing, the color separation processing unit 104 refers to a three-dimensional color separation LUT stored in a color separation LUT storage unit 105. In the color separation LUT, the color material amount values (ink values) of the four color inks are described on thinned lattice points of 17×17×17 points, and values between the lattice points are calculated by linear interpolation.

A quantization processing unit 106 converts the ink value image of each color obtained by the color separation processing unit 104 into a quantization image of the number of tones smaller than the number of input tones with two or more values. In this embodiment, the quantization processing unit 106 quantizes the ink value image by comparison processing with a dither matrix for each ink color stored in a dither matrix storage unit 107. The quantization image data generated by the quantization processing unit 106 is output from an output terminal 108 to the printer 2. A threshold matrix generation apparatus 301 generates a dither matrix for each ink color, and stores it in the dither matrix storage unit 107. The threshold matrix generation apparatus 301 may be separated from the image processing apparatus 1, or may be incorporated as part of a function executed by the image processing apparatus 1. A dither matrix generation method will be described later.

The printer 2 forms, on a recording medium, the quantization data generated by the image processing apparatus 1. In this embodiment, the recording head 201 uses an inkjet method or the like. The recording head 201 is, for example, a long line head in which a plurality of nozzles for discharging a color material (ink) are arranged to cover the entire range of a drawing region in the widthwise direction of the recording medium. By discharging the ink while relatively moving the recording medium with respect to the recording head 201, a print image is formed. In this embodiment, four color inks of cyan (M), magenta (M), yellow (Y), and black (K) are mounted on the recording head 201.

An input terminal 204 receives the quantization image data formed by the image processing apparatus 1, and transfers the data to an ink color selection unit 203. The ink color selection unit 203 selects an ink color corresponding to the quantization image data from the ink colors mounted on the recording head 201. A head control unit 202 generates, based on the quantization image data, a driving signal for controlling the recording head 201. The recording head 201 drives the recording head of the selected ink color based on the driving signal to actually record each ink dot on the recording medium.

(Relationship Between Overlapping of Dots and Power Spectrum)

In an arrangement, like the printer 2, in which dots of a plurality of colors are overlapped on the same drawing region of the recording medium to execute recording, a power spectrum that is not included in the original dot pattern of each color is generated due to the overlapping of the colors. The relationship between overlapping of dots of two kinds of inks and a power spectrum generated by the overlapping will be described below.

Figure 2:
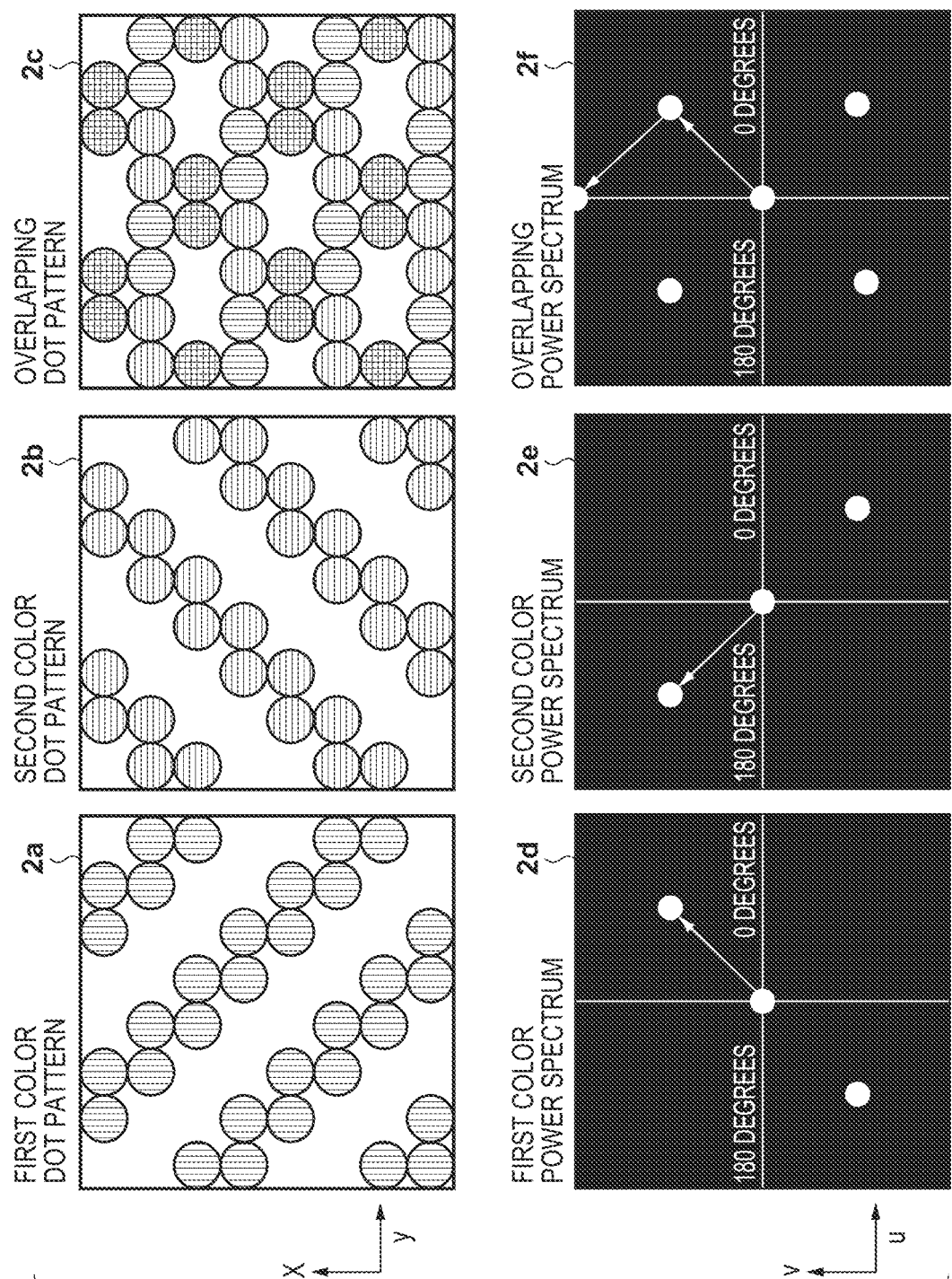
FIG. 2 is a view for explaining the characteristics of a dot pattern and a power spectrum in the AM method.

FIG. 2 is a view showing the characteristics of a dot pattern and a power spectrum in the AM method. A pattern 2a shows an example of a dot pattern (indicated by dots with a vertical stripe pattern) for recording ink (for example, cyan) of the first color. A pattern 2b shows an example of a dot pattern (indicated by dots with a horizontal stripe pattern) for recording ink (for example, magenta) of the second color. Furthermore, a pattern 2c shows a dot pattern obtained by overlapping the pattern 2a of the ink dots of the first color and the pattern 2b of the ink dots of the second color. In the dot pattern indicated by the pattern 2c, dots with a vertical and horizontal stripe pattern are dots each obtained by overlapping the two kinds of inks. The overlapping dot generally has no density obtained by simply adding two kinds of dot densities due to a coalescence phenomenon in which two ink droplets coalesce on the recording medium, nonlinearity of color development by the mixed color of the inks, or the like. As a result, in the overlapping dot pattern, frequency components of the dot pattern represented by the logical product or the logical sum of the dot patterns of the two kinds of inks are generated.

The frequency and direction of the frequency components generated by overlapping of the two kinds of inks can be obtained as a result of obtaining the convolution of the frequency components in the frequency domain from the relationship between the product and the convolution in the characteristic of Fourier transform. Two-dimensional Fourier transform is performed for the patterns 2a, 2b, and 2c to indicate, by spectra 2d, 2e, and 2f, the power spectra each representing power (the square of the absolute value) by the gray level. In each of the spectra 2d, 2e, and 2f, the center corresponds to a DC component, a u direction corresponds to frequency components in a y direction of each of the patterns 2a, 2b, and 2c, a v direction corresponds to frequency components in an x direction of each of the patterns 2a, 2b, and 2c, and a white portion indicates large power. In a case of a cyclic line screen pattern like the pattern 2a or 2b, in the frequency domain, a peak appears at a deviation angle orthogonal to the screen angle at the coordinates of the frequency inversely proportional to the cycle of the screen, as indicated by the spectrum 2d or 2e.

Furthermore, the frequency components generated by the logical product or the logical sum (the logical product of the inverted patterns) of the two kinds of dot patterns appear at positions where the convolution of the frequency components is obtained in the frequency domain. Therefore, a power spectrum indicated by the spectrum 2f can be obtained as frequency components generated by overlapping of the colors. Note that since the same characteristic appears within a range of 0° to 180° and a range of 180° to 360° in the frequency domain, the characteristic within the range of 0° to 180° will now be described. As indicated by the spectrum 2f, a frequency component that is not included in the original patterns is generated by overlapping of the two colors. This phenomenon is called the moiré effect. In general, as the difference in screen angle between the colors is closer to 90°, the generated frequency component is shifted more to the high frequency side, and it is thus possible to suppress occurrence of low frequency moiré. In actual AM screen printing, printing is often executed by assigning 15° to C, 75° to M, 0° to Y, and 45° to K with respect to four colors of C, M, Y, and K.

Next, the relationship between overlapping of dots in a case where blue noise patterns are recorded as dot patterns of two kinds of inks and a power spectrum generated by the overlapping will be described.

Figure 3:
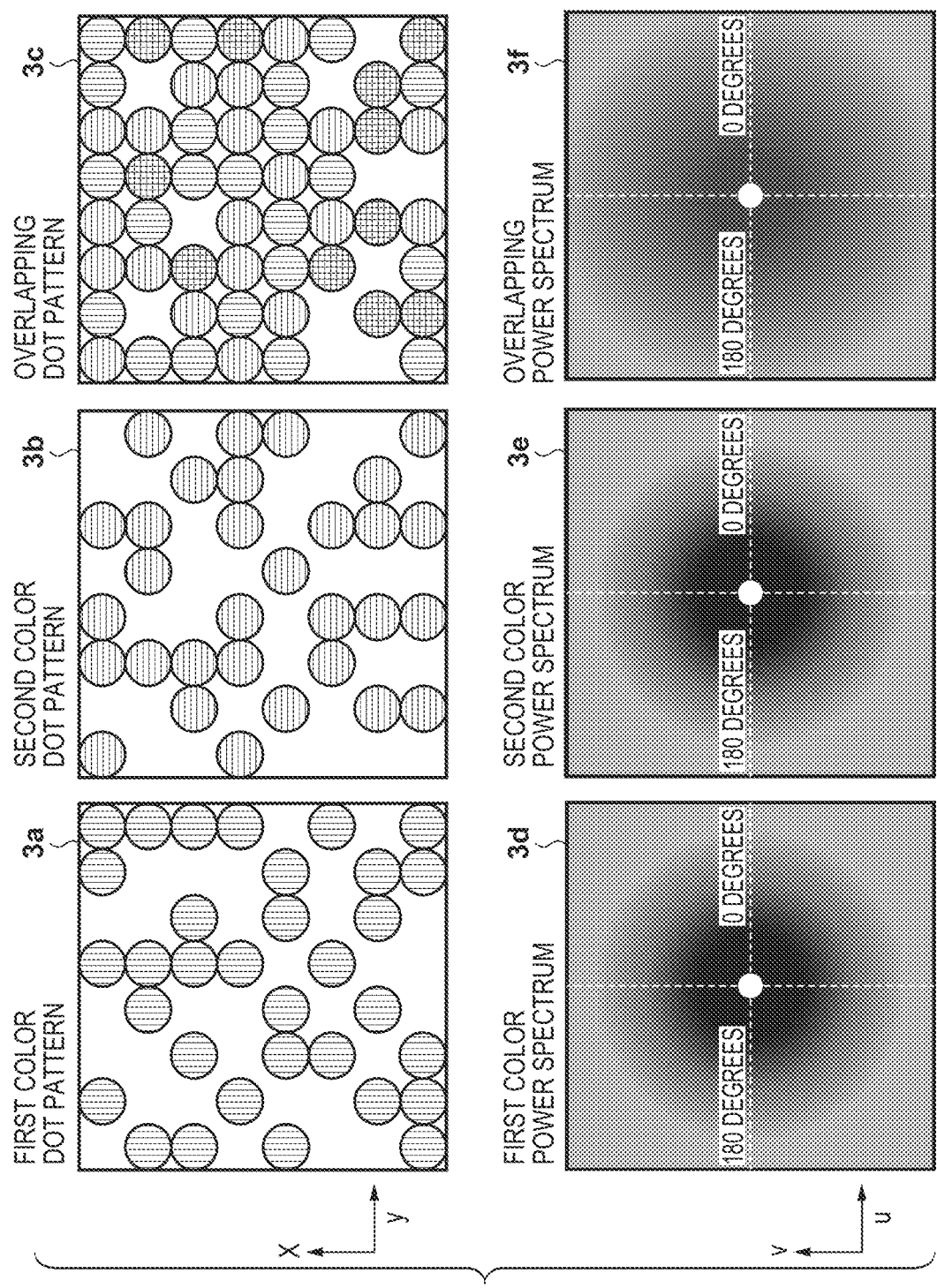
FIG. 3 is a view for explaining the characteristics of a dot pattern and a power spectrum in the FM method.

FIG. 3 is a view for explaining the characteristics of a dot pattern and a power spectrum in the FM method. A pattern 3a shows an example of a blue noise dot pattern for recording ink of the first color, and a pattern 3b shows an example of a blue noise dot pattern for recording ink of the second color. In addition, a pattern 3c shows a dot pattern obtained by overlapping ink dots of the first color shown in the pattern 3a and ink dots of the second color shown in the pattern 3b. In the dot pattern indicated by the pattern 3c, dots with a vertical and horizontal stripe pattern are dots each obtained by overlapping the two kinds of inks. Two-dimensional Fourier transform is performed for the dot patterns indicated by the patterns 3a, 3b, and 3c to indicate, by spectra 3d, 3e, and 3f, the power spectra each representing power (the square of the absolute value) by the gray level. The center of each of the spectra 3d, 3e, and 3f corresponds to a DC component, a u direction corresponds to frequency components in a y direction of each of the patterns 3a, 3b, and 3c, a v direction corresponds to frequency components in an x direction of each of the patterns 3a, 3b, and 3c, and a white portion indicates large power. In a case of a blue noise pattern in which dots are acyclically dispersed like the pattern 3a or 3b, a frequency characteristic is obtained in the frequency domain, in which there is no peak at a specific deviation angle, low frequency components are suppressed, and high frequency components have power, as indicated by the spectrum 3d or 3e. Then, it can be predicted that as frequency components generated by the logical product or the logical sum (the logical product of the inverted patterns) of the two kinds of dot patterns, aliasing of high frequency components of each color occurs as low frequency components, as indicated by the spectrum 3f.

As described with reference to FIG. 2, if the dot pattern of the AM method having power at a specific frequency and deviation angle is used, it is possible to suppress occurrence of low frequency moiré by shifting the power of aliasing caused by interference between a plurality of ink dots to the high frequency side. On the other hand, a characteristic is obtained in which interference with an input image readily occurs due to the cyclic structure of the dot pattern and a Rosette pattern may be generated by overlapping of colors. Furthermore, if the blue noise pattern of the FM method is used, a characteristic is obtained in which interference with an input image is difficult to occur due to the acyclic structure, and a Rosette pattern is also difficult to be generated. On the other hand, as described with reference to FIG. 3, if the blue noise pattern is used, a characteristic is obtained in which low frequency components are generated by convolution of frequency components in a high frequency range (the spectrum 3f of FIG. 3) to appear in a form of graininess and then the image quality of a mixed color image may degrade.

To cope with this, in this embodiment, a dot pattern having both the characteristic of the AM method and that of the FM method is used. By using such dot pattern, generation of low frequency components caused by convolution of frequency components in a high frequency range while suppressing occurrence of interference with an input image or generation of a Rosette pattern caused by overlapping of colors.

The relationship between overlapping of dots in a case where the dot patterns having the above characteristics are recorded as the dot patterns of the two kinds of inks and a power spectrum generated by the overlapping will be described with reference to FIG. 4.

Figure 4:
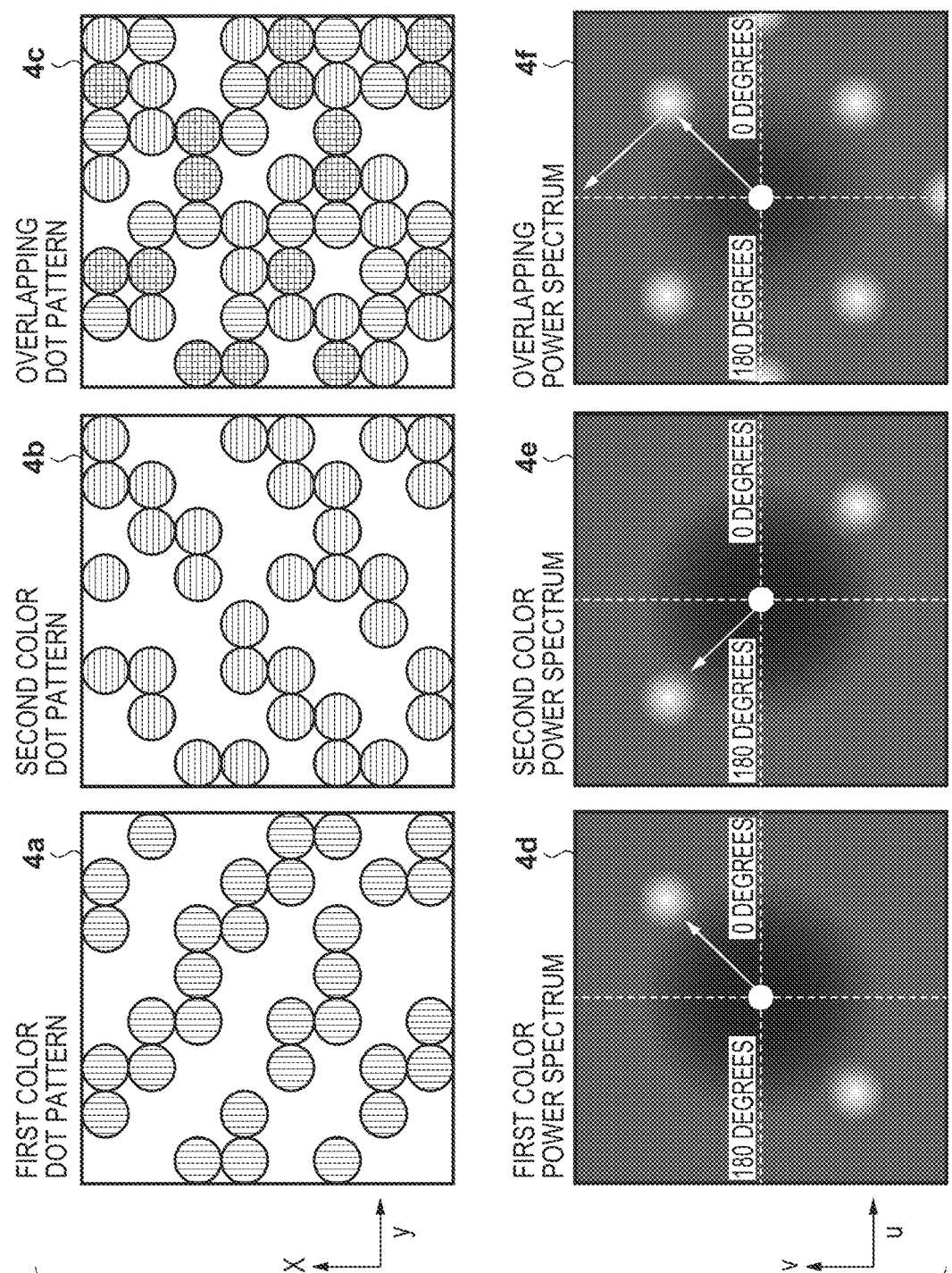
FIG. 4 is a view for explaining the characteristics of a dot pattern and a power spectrum according to the first embodiment.

In FIG. 4, a pattern 4a shows an example of a dot pattern for recording ink of the first color, and a pattern 4b shows an example of a dot pattern for recording ink of the second ink. In addition, a pattern 4c shows a dot pattern obtained by overlapping ink dots of the first color shown in the pattern 4a and ink dots of the second color shown in the pattern 4b. In the dot pattern indicated by the pattern 4c, dots each represented by vertical and horizontal lines are dots each obtained by overlapping the two kinds of inks. As indicated by the pattern 4a, the dot pattern for recording the ink of the first color is a pattern that tends to be continuous in a predetermined angle direction and has an irregular characteristic. As indicated by the pattern 4b, the dot pattern for recording the ink of the second color is a pattern that tends to be continuous at an angle separated from the angle direction of the dot pattern of the ink of the first color indicated by the pattern 4a and has an irregular characteristic.

Two-dimensional Fourier transform is performed for the dot patterns indicated by the patterns 4a, 4b, and 4c to indicate, by spectra 4d, 4e, and 4f, the power spectra each representing power (the square of the absolute value) by the gray level. The center of each of the spectra 4d, 4e, and 4f corresponds to a DC component, a u direction corresponds to frequency components in a y direction of each of the patterns 4a, 4b, and 4c, a v direction corresponds to frequency components in an x direction of each of the patterns 4a, 4b, and 4c, and a white portion indicates large power. As indicated by the spectrum 4d, the dot pattern for recording the ink of the first color is a pattern having a blue noise characteristic in which there is a peak at a predetermined deviation angle in the power spectrum. As indicated by the spectrum 4e, the dot pattern for recording the ink of the second color is a pattern having a blue noise characteristic in which there is a peak at a deviation angle separated from the predetermined deviation angle by a predetermined value or more. That is, in the power spectra in the frequency domain, there is an angle difference of a predetermined value or more between the deviation angle of the peak of the dot pattern of the first color and the deviation angle of the peak of the dot pattern of the second color. This suppresses low frequency components generated by convolution of the dot pattern of the ink of the first color and the dot pattern of the ink of second color in the power spectra. The power spectrum indicated by the spectrum 4f can be predicted as frequency components generated by the logical product or the logical sum (the logical product of the inverted patterns) of the two kinds of dot patterns.

As indicated by the patterns 4a and 4b and the spectra 4d and 4e, the patterns having the blue noise characteristic in which there is a peak at the deviation angle of the predetermined value or more in the frequency domain are used as the dot patterns for recording the ink of the first color and the ink of the second color. Therefore, it is possible to shift part of the power of aliasing to the high frequency side, as in the AM method, in the pattern obtained by overlapping the dot pattern of the ink of the first color and the dot pattern of the ink of the second color, thereby suppressing generation of low frequency components. Note that since the pattern also has the irregular blue noise characteristic, as in the FM method, it is possible to suppress interference with an input image and generation of a Rosette pattern caused by overlapping of colors.

Note that in the case of the line screen shown in FIG. 2, a peak also appears at an angle in a direction vertical to the screen angle generally in a bright tone or dark tone, and angles are often assigned within the range of 0° to 90°. However, in this embodiment, since the pattern is generated to have the blue noise characteristic as the irregular dot arrangement in a bright tone or dark tone, there is no peak at an angle in the vertical direction, and the deviation angles can be dispersed and assigned within the range of 0° to 180°. For example, if there are n color materials, the directions (deviation angles) of the peaks can be dispersed and assigned by 180°/n. More specifically, with respect to the four colors of C, M, Y, and K, the deviation angles can be assigned as follows. For example, 45° is assigned to C, 135° is assigned to M, 0° (180°) is assigned to Y, and 90° is assigned to K. The present invention is not limited to this, as a matter of course. The deviation angles of the peaks may be dispersed and assigned, as follows. For example, 150° may be assigned to C, 30° may be assigned to M, 75° may be assigned to Y, and 105° may be assigned to K (in this case, an angle difference of 30° or more is obtained with respect to the deviation angle of each color). Note that even in the case of the line screen shown in FIG. 2, it is possible to generate a pattern to have the blue noise characteristic in a bright tone or dark tone but an irregular pattern and a regular pattern are mixed in accordance with the tone, thereby degrading a feeling of uniformity. On the other hand, according to this embodiment, it is possible to suppress degradation of a feeling of uniformity by using, in a halftone, the pattern having the blue noise characteristic in which there is a peak at a specific deviation angle.

(Procedure of Image Forming Processing)

Figure 5:
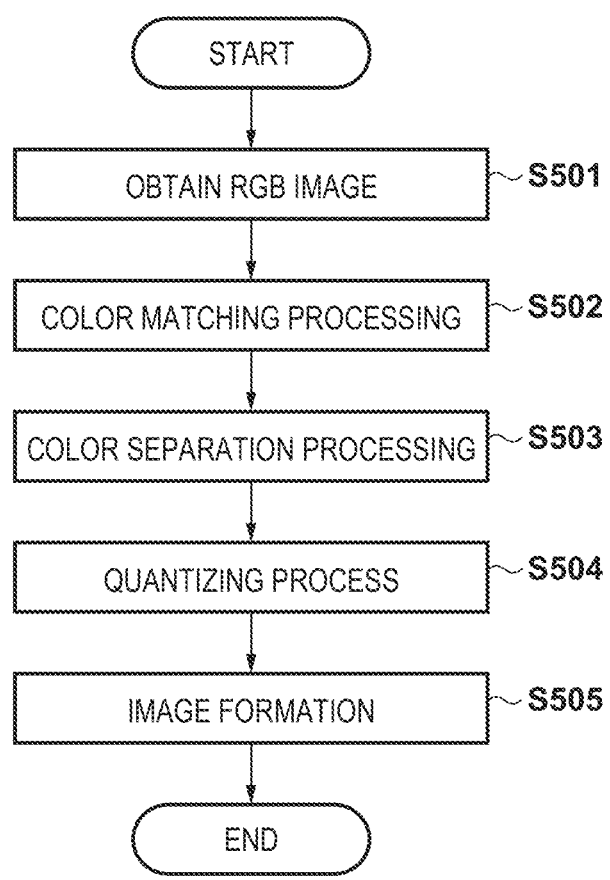
FIG. 5 is a flowchart for explaining the operation of image forming processing according to the first embodiment.

Image forming processing by the image processing apparatus 1 of this embodiment for implementing the above-described image generation will be described next with reference to a flowchart shown in FIG. 5.

The image processing apparatus 1 obtains an input image from the image data input terminal 101 (step S501). Next, the color matching processing unit 102 performs color matching processing for the obtained input image (step S502). In the color matching processing, the color matching processing unit 102 refers to the three-dimensional color matching LUT stored in the color matching LUT storage unit 103. Next, the color separation processing unit 104 performs color separation processing for the image data processed by the color matching processing unit 102, thereby generating ink value images (step S503). In the color separation processing, the three-dimensional color separation LUT stored in the color separation LUT storage unit 105 is referred to. Next, the quantization processing unit 106 performs quantization processing of converting the data having undergone the color separation processing into binary data, thereby obtaining binary image data (step S504). The image processing apparatus 1 outputs, from the output terminal 108, the binary image data having undergone the quantization processing in an arbitrary size for the entire image or a bandwidth of each unit recording region.

The printer 2 receives the quantization image data (binary image data) from the input terminal 204, thereby forming an image (step S505). In the image formation, the ink color selection unit 203 selects an ink color based on the binary image data having undergone the quantization processing to generate scan data, and sends the scan data to the head control unit 202. The head control unit 202 drives the recording head 201 in accordance with the received scan data to record a dot pattern on a recording medium. While the printer 2 moves the recording medium with respect to the recording head 201, the head control unit 202 drives each nozzle of the recording head 201 at a predetermined driving interval, thereby recording an image on the recording medium. The series of image forming processes is then completed.

(Description of Quantization Processing Unit)

Figure 6:
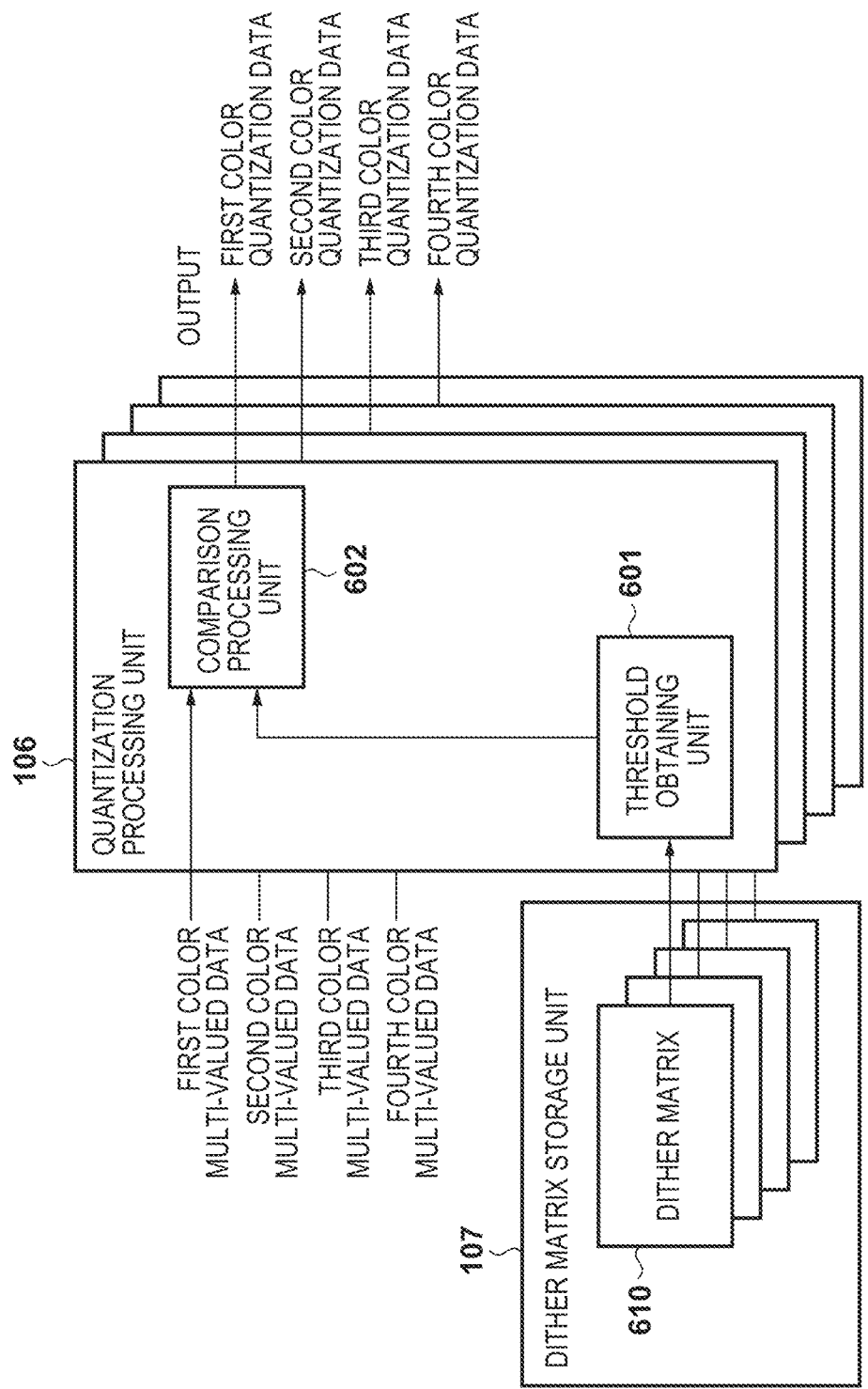
FIG. 6 is a block diagram showing an example of the arrangement of quantization processing according to the first embodiment.

FIG. 6 is a block diagram for explaining details of the quantization processing executed by the quantization processing unit 106 of this embodiment. The quantization processing of this embodiment is executed by a dither method. In the quantization processing of this embodiment, processing concerning a threshold is performed, and processing of comparing an input value with the threshold is performed. These processes are simultaneously performed for respective colors (channels). Each process will be described in detail with reference to FIG. 6.

Assume that the quantization processing unit 106 can receive a signal of up to 16 bits. FIG. 6 shows a state in which 16-bit data (multi-valued data of the first to fourth colors) of inks of the first to fourth colors are simultaneously input. A threshold obtaining unit 601 obtains a threshold corresponding to the pixel position of the processing target data from the dither matrix storage unit 107 formed by a memory such as a ROM. In this embodiment, a dither matrix 610 is a threshold matrix in which thresholds of 0 to 65535 are arranged to have a predetermined characteristic, and can have various shapes and sizes of 512×512 pixels, 256×256 pixels, and 256×512 pixels. The dither matrix storage unit 107 stores, in advance, a plurality of threshold matrices corresponding to the respective ink colors, and the threshold obtaining unit 601 selects the threshold matrix corresponding to the ink color. Then, the threshold obtaining unit 601 provides, to a comparison processing unit 602, the threshold corresponding to a pixel position (x, y) of the processing target data from the plurality of thresholds arrayed in the selected threshold matrix. The feature of the threshold matrix having the predetermined characteristic will be described in detail later. The comparison processing unit 602 compares the processing target multi-valued data with the threshold obtained by the threshold obtaining unit 601, thereby deciding recording (1) or non-recording (0) at the pixel position.

(Dither Matrix Generation Method)

A dither matrix generation method according to this embodiment will be described. In the following description, M represents a dither matrix in a generation step or a generated dither matrix. The dither matrix M is a two-dimensional array having a size of Sx rows in the x direction (the conveyance direction of the recording medium) and a size of Sy columns in the y direction (the widthwise direction of the recording medium) (Sx and Sy are natural numbers). The size (Sz, Sy) of the dither matrix M is arbitrary but each side typically has a length of a power of 2, and preferably has a length of 256 pixels or more (for example, 256×256 pixels, 512×512 pixels, or 256×512 pixels). In this embodiment, assume that Sx is 256 pixels and Sy is 256 pixels.

As a method of generating a dot dispersion dither matrix, the void-and-cluster method is known. In the void-and-cluster method, a smoothing density image is obtained by applying a low-pass filter, an arrangement point at which a dot is to be added is decided to suppress a local density variation, and these operations are repeated, thereby generating a dither matrix representing each tone. In this embodiment as well, a dither matrix having the dot dispersion blue noise characteristic or green noise characteristic is generated by the similar method.

A dot pattern generated in the process of generating the dither matrix is represented by d(x, y). Here, d(x, y) represents a two-dimensional array, and has a size equal to that of a dither matrix M(x, y). The value of each pixel of d(x, y) is 1 in a case where a dot is present, and is 0 in a case where no dot is present. The dot pattern d(x, y) changes in the repetition process for generating the dither matrix M. In the repetition process, Sx×Sy+1 dot patterns from a dot pattern whose number of dots is 0 to a dot pattern whose number of dots is Sx×Sy are generated. Thus, if g represents the number of dots in the dot pattern d(x, y), a dot pattern at a given point of time in the repetition process can be specified using g. In the following description, the number g of dots will be referred to as a tone value g, and the dot pattern d(x, y) in a case where the tone value is g will be referred to as d(g, x, y) or d(g) by omitting "x, y".

A density variation map to be used to evaluate the density of dots generated in the repetition process is represented by n(g). In the density variation map n(g), a position where a value is smaller is evaluated as a position where the smoothing density is lower and the density of dots is lower. Conversely, in the density variation map n(g), a position where a value is larger is evaluated as a position where the smoothing density is higher and the density of dots is higher. In step S103 of FIG. 7 to be described later, at a position where a value is small in the density variation map n(g), that is, at a position where the density of dots is low, a dot is added. This suppresses a density variation, thereby obtaining a dot pattern for implementing low graininess. The density variation map n(g) is a two-dimensional array having a size equal to that of the dot pattern d(g), and values in the array change in accordance with the tone value g, similar to the dot pattern d(g). In the following description, n(g) will also be referred to as n(g, x, y). In step S102 of FIG. 7 to be described later, the density variation map n(g) is obtained by applying a filter to the dot pattern d(g). Since it is assumed that the dither matrix is cyclically applied to the input image, the density variation map n(g) is generated by adding the cyclic convolution result of the dot pattern d(g) and a filter coefficient. The cyclic convolution is an operation of performing normal convolution between the filter coefficient and the dot pattern d(g) set with a cyclic boundary condition. Note that the filter coefficient used in step S102 will be described later in detail.

Figure 7:
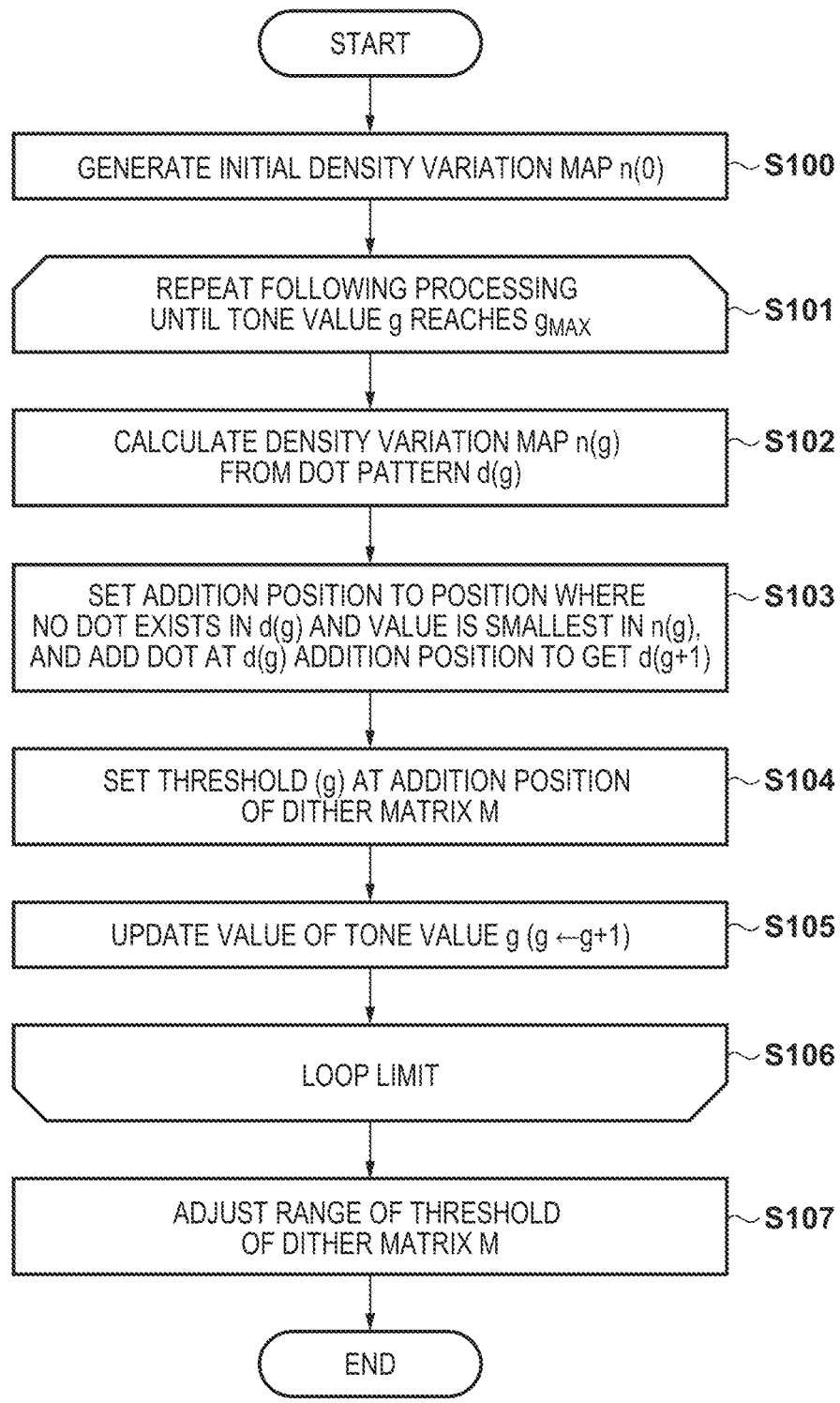
FIG. 7 is a flowchart for explaining dither matrix generation processing according to the first embodiment.

The dither matrix generation processing according to this embodiment will be described in detail below with reference to FIG. 7. FIG. 7 is a flowchart illustrating the overall procedure of the dither matrix generation method. An example of generating a dither matrix for each of four color inks of cyan (C), magenta (M), yellow (Y), and black (K) will be described below. The threshold matrix generation apparatus 301 generates, as an initial density variation map n(0), a density variation map in a case where the tone value g is 0 (step S100). The initial density variation map n(0) is a density variation map formed by initial values. In this case, in the dither matrices corresponding to the four colors of C, M, Y, and K, a density variation is applied in advance to the initial density variation map n(0) so that angles are assigned to the peaks of the power spectra. In this example, the angle of the peak of the power spectrum is 45° for cyan, 135° for magenta, 0° for yellow, and 90° for black. Furthermore, random numbers with an amplitude equal to or smaller than the above-described density variation are given so as not to obtain a regular pattern. For example, the initial density variation maps n(0) for C, M, Y, and K are generated by equations (1) to (4) below.

For cyan:

$$n(0, x, y) = \begin{cases} 0 + rand & \text{for } (x+y)\%4 < 2 \\ \frac{1}{32} + rand & \text{for } (x+y)\%4 \geq 2 \end{cases} \quad (1)$$

For magenta:

$$n(0, x, y) = \begin{cases} 0 + rand & \text{for } (x-y+256)\%4 < 2 \\ \frac{1}{32} + rand & \text{for } (x-y+256)\%4 \geq 2 \end{cases} \quad (2)$$

For yellow:

$$n(0, x, y) = \begin{cases} 0 + rand & \text{for } (y)\%2 < 1 \\ \frac{1}{64} + rand & \text{for } (y)\%2 \geq 1 \end{cases} \quad (3)$$

For black:

$$n(0, x, y) = \begin{cases} 0 + rand & \text{for } (x)\%2 < 1 \\ \frac{1}{64} + rand & \text{for } (x)\%2 \geq 1 \end{cases} \quad (4)$$

Note that in equations (1) to (4) above, rand represents a random number having a different value for each pixel position (h, w), and the amplitude of the random number is smaller than the density difference given to the initial density variation map. In this example, the amplitude of the random number rand falls within the range of 0 to 1/64. Furthermore, % represents a remainder. For example, "(x) %4" represents a remainder obtained by dividing x by 4. In equations (1) to (4), a density variation cyclically repeated in a predetermined direction is given. For example, in equation (1), while (x+y) %4 cyclically changes to 0, 1, 2, and 3, the value of the density difference repeatedly has 0 and 1/64, and the repeating direction is a direction of 45°.

As described above, the initial density variation is given at a different angle for each color to the initial density variation map n(0). In step S104 to be described later, a dot is added at a position where the value in the density variation map n(g) is small, and thus the dot arrangement that is continuous in a predetermined angle direction for each color can be implemented by the initial density variation. Note that in equations (1) to (4) above, the density differences in the initial density variation are 1/32 and 1/64 but the present invention is not limited to them. The density difference in the initial density variation may be given as a parameter and the user may be able to adjust the parameter. As the density difference given in advance is larger, the value of the peak at the spatial frequency is larger, and such regular arrangement that the characteristic of the AM method is strong is obtained. On the other hand, as the given density difference is smaller, the value of the peak at the spatial frequency is smaller, and such irregular arrangement that the characteristic of the FM method is strong is obtained. Furthermore, it is preferable to set the density difference to be relatively smaller as the frequency of the given density variation is higher.

Steps S101 to S106 indicate processing of repeating dot addition. Steps S101 and S106 are loop limits, and indicate that processes in steps S102 to S105 are repeated until the tone value g reaches $g_{MAX}$ from 0. In the processes in steps S102 to S105, one dot is added to the dot pattern d(g) of the tone value g to generate a dot pattern d(g+1) of the adjacent tone, that is, a tone value g+1. Then, the tone value g is set at a position corresponding to the addition position of the dot in the dither matrix M. This embodiment sets $g_{MAX}$=Sx× Sy−1=65535. In this way, the processing of adding the dot is repeated from 1 to 65536, thereby generating dot patterns of all tones and dither matrices corresponding to all tones.

The threshold matrix generation apparatus 301 performs convolution for the dot pattern d(g) corresponding to the tone value g using a low-pass filter f (to be described later), and adds the initial density variation map n(0), thereby calculating the density variation map n(g) (step S102). More specifically, the density variation maps n(g, x, y) at all the positions (x, y) are calculated by the following equation. Note that in convolution, with respect to a portion where the filter coefficient f falls outside the dot pattern d(g), the maps are calculated as if they were connected in the vertical and horizontal directions by circularly referring to the dot pattern. Note that if g=0, n(0) is used intact, and 0 is set at all the positions in the dot pattern d(0).

$$n(g, x, y) = \sum_{i=-ki+1}^{ki} \sum_{j=-kj+1}^{kj} f(ki-i, kj-j) \times d(g, (x+i)\%Sfx, (y+j)\%Sfy) + n(0, x, y) \quad (5)$$

$$\text{where } \left(ki = \frac{sfx}{2}, kj = \frac{sfy}{2}\right)$$

Next, the threshold matrix generation apparatus 301 specifies, as the addition position of a dot, a pixel position $(x_{MIN}, y_{MIN})$ where the value is smallest in the density variation map n(g), among pixel positions that are OFF in the dot pattern d(g). Then, the threshold matrix generation apparatus 301 adds a dot at the specified addition position $(x_{MIN}, y_{MIN})$ in the dot pattern d(g), thereby generating the dot pattern d(g+1) of the tone value g+1 (step S103). Furthermore, the threshold matrix generation apparatus 301 sets, to the tone value g, a value (a value in $M(x_{MIN}, y_{MIN})$) in the dither matrix M corresponding to the addition position $(x_{MIN}, y_{MIN})$ of the dot (step S104). To perform processing with respect to the next tone value, the threshold matrix generation apparatus 301 increments the tone value g to obtain g+1 (step S105). The above processes are repeated for g=0 to 65535 to set numerical values of 0 to 65535 in the dither matrix M.

After the end of the loop of steps S101 to S106, the threshold matrix generation apparatus 301 adjusts the range of the value in the dither matrix M in accordance with the range of the pixel value of the input image (step S107). In a stage before step S107 is performed, values of 0 to 65535 ($m_{MIN}$ to $m_{MAX}$) are stored in the dither matrix M(x, y). Since the input image when performing dither processing is an 8-bit image, the range of the input image is 0 to 255 ($th_{MIN}$ to $th_{MAX}$), even if the dither matrix in which values of 0 to 65535 are stored is used, an appropriate halftone processing result cannot be obtained. To cope with this, in step S107, the range of the value in the dither matrix M(x, y) is adjusted in accordance with the input image. For example, if it is desirable to set the range of the value in the dither matrix to a range of $th_{MIN}$ to $th_{MAX}$, the value in the adjusted dither matrix M is an integer part of a×M(x, y)+b. Note that a=$(th_{MAX}-th_{MIN})/(m_{MAX}-m_{MIN})$ and b=$th_{MIN}$−a× $m_{MIN}$. The adjusted dither matrix M is stored in the dither matrix storage unit 107. Note that the function of the threshold matrix generation apparatus 301 may be incorporated in the image processing apparatus 1. In this case, for example, the user of the image processing apparatus 1 may be able to generate (update) the dither matrix at an arbitrary timing. At this time, the user may be able to set, as a parameter, the density difference (equations (1) to (4)) to be given to the initial density variation map.

(Details of Filter Coefficient)

The low-pass filter coefficient f used in step S102 of this embodiment will be described. This filter coefficient is used to calculate the density variation map n(g). f represents a two-dimensional array, and is also described as f(fx, fy). This embodiment assumes that the array size of f(fx, fy) is equal to that of the dither matrix M. That is, when Sfx represents the filter size in the fx direction and Sfy represents the filter size in the fy direction, the values of Sfx and Sfy are 256. In step S104, the density of dots is reduced by adding dots to relax the density variation map n(g), thereby implementing low graininess. To preferably implement this, it is necessary to extract the density of the dots. The density of the dots can be extracted by applying, for example, a low-pass filter to the dot pattern. In this embodiment, the filter f is set as a function concerning the reciprocal of a distance r from the center portion of the filter, as given by equations (6), thereby improving the dispersibility. Note that in this embodiment, 1 is added to the denominator to avoid division by 0 when distance r=0.

$$r(dx, dy) = \sqrt{dx^2 + dy^2} \quad (6)$$

$$f(fx, fy) = \text{filter}\left(\text{kernel}, \frac{1}{r(fx - x_0, fy - y_0) + 1}\right)$$

In equations (6), $(x_0, y_0)$ represents the center position of the filter, and $x_0$=Sfx/2 and $y_0$=Sfy/2. The filter function represents a two-dimensional convolution filter, and two-dimensional convolution filter processing based on the kernel coefficient is performed by setting $(f_x, f_y)$ as a center. In this case, the filter processing based on the kernel will be referred to as first filter processing hereinafter. The kernel is, for example, a Gaussian filter having a size of 3×3 or 5×5. With respect to the frequency band of the blue noise characteristic of the generated dot arrangement, it is possible to shift the start of the peak to the high frequency side as the kernel size is smaller and to the low frequency side as the kernel size is larger. The filter f given by equations (6) performs convolution processing (to be referred to as second filter processing hereinafter) using a coefficient generated based on a value associated with the reciprocal of the distance from the center portion of the filter. The convolution operation (second filter processing) given by equation (5) is performed for the processing result of the first filter processing. With the second filter processing, a larger value is added at a position in the density variation map n(g) as the position is closer to a dot arranged in the dot pattern d(g). Therefore, it is possible to prevent a dot from being arranged near the already arranged dot, thereby obtaining a density variation map that improves the dispersibility of the dots. Note that the filter f used in step S102 is not limited to this, and a low-pass filter that can extract frequency components perceived as granular feeling may be used. The first filter processing may be performed after the second filter processing is performed.

According to the processing procedure shown in FIG. 7 described above, it is possible to generate a dither matrix for implementing a dot arrangement that is continuous in a predetermined angle direction for each of C, M, Y, and K and has an irregular characteristic in which the same pattern is hardly repeated within the range of the dither matrix.

(Characteristic of Generated Dot Pattern)

Figure 8:
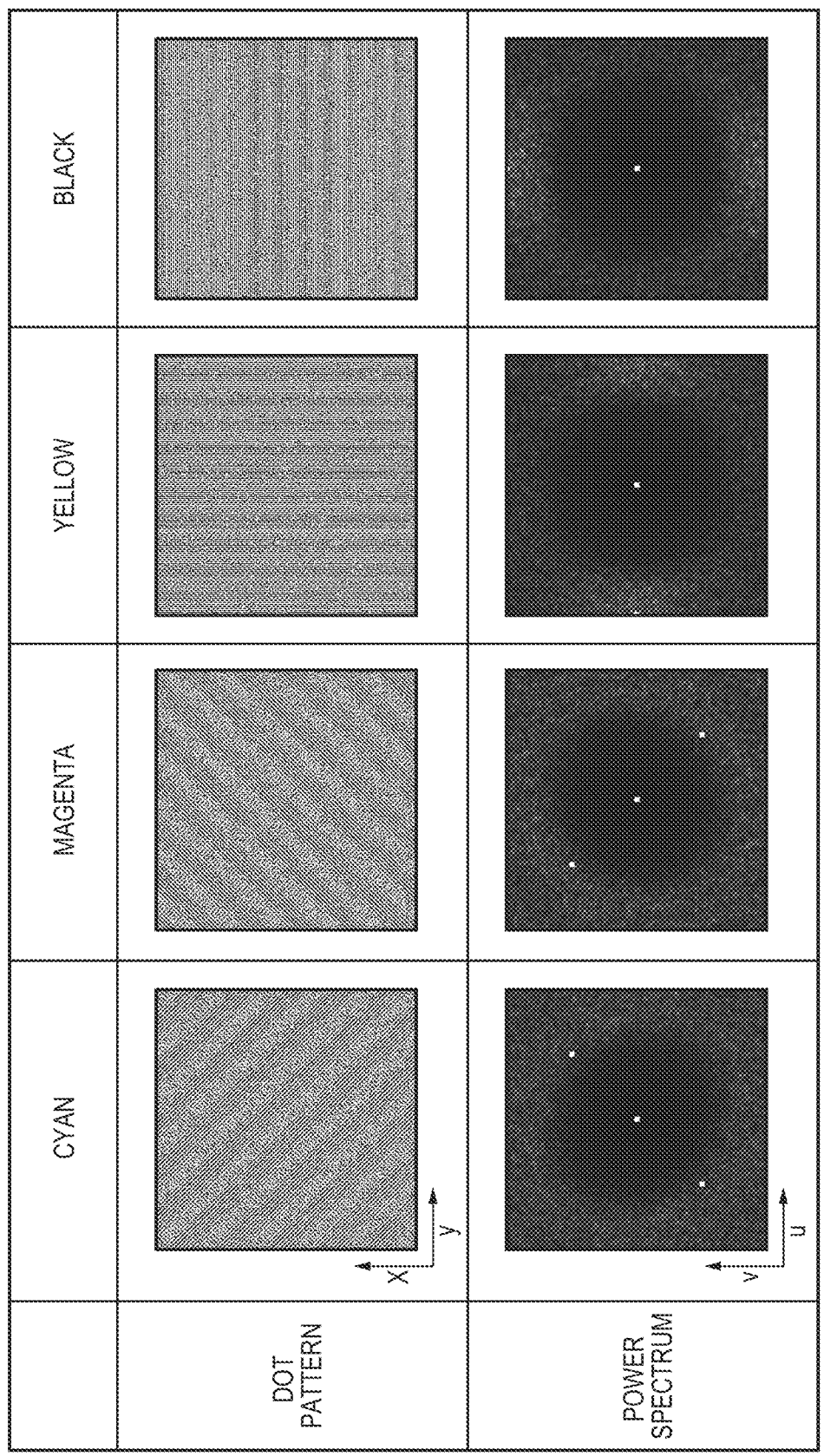
FIG. 8 is a view for explaining dot patterns according to the first embodiment.

FIG. 8 shows dot patterns generated using the dither matrices generated by the processing shown in FIG. 7, and the power spectra of the dot patterns. It can be confirmed that the power spectra shown in FIG. 8 have the blue noise characteristic in which low frequency components are suppressed, and have a speak at 45° for C, a peak at 135° for M, a peak at 0° (180°) for Y, and a peak at 90° for K. In a case where convolution of frequency components in the frequency domain is obtained, the frequency and deviation angle of the peak of each color are desirably located at positions where there is no aliasing into the low frequency band. As indicated by the power spectra in the lower portion of FIG. 8, the respective colors have the peaks at deviation angles separated from each other by a predetermined value or more in the frequency domain. This can shift part of the power of aliasing to the high frequency side as in the AM method, and suppress generation of low frequency components. In addition, since the power spectra have the blue noise characteristic in which low frequency components are suppressed, it is possible to suppress interference with the input image and generation of a Rosette pattern caused by overlapping of colors.

Second Embodiment

In the first embodiment, an example of concentrating power on a specific frequency/deviation angle in the power spectrum has been explained. The second embodiment will describe an example of collecting power at a specific frequency/deviation angle and around it. Note that the same arrangement as in the first embodiment is adopted and details of a dither matrix generation method according to the second embodiment will be described below with reference to FIG. 7.

The overall procedure of the dither matrix generation method according to the second embodiment will be described with reference to a flowchart shown in FIG. 7. A threshold matrix generation apparatus 301 generates an initial density variation map n(0) in a case where a tone value g is 0 (step S100). In this embodiment, in generation of dither matrices corresponding to four colors of C, M, Y, and K, only random numbers (rand) with a small amplitude for preventing a regular pattern are given without giving a density variation of a predetermined angle, unlike the first embodiment. The initial density variation map of each of C, M, Y, and K is set by equation (7) below. Processes in subsequent steps S101 to S107 are the same as in the first embodiment.

$$n(0,x,y)=\text{rand} \quad (7)$$

(Details of Filter Coefficient)

A low-pass filter coefficient f used in step S102 of the second embodiment will be described. In this embodiment, by giving a different anisotropy to the filter coefficient for each color in accordance with equations (8) to (12) below, angles are assigned to the peaks of the power spectra, as follows. For example, 45° is assigned to C, 135° is assigned to M, 0° is assigned to Y, and 90° is assigned to K. In equations (9) to (12), a different characteristic is obtained for each region divided based on a predetermined direction so that the peak appears in the predetermined direction in each power spectrum (for example, the kernel size is different for each region). Note that similar to the first embodiment, a function concerning the reciprocal of a distance r (equation (8)) from the center portion of the filter is used to improve the dispersibility.

$$r(dx, dy) = \sqrt{dx^2 + dy^2} \qquad (8)$$

For cyan:

$$f(fx, fy) = \begin{cases} \text{filter}\left(\text{kernel3}, \frac{1}{r(fx-x_0, fy-y_0,)+1}\right) & \text{for } \text{abs}(fx-x_0) - \text{abs}(fy-y_0) > 0 \\ \text{filter}\left(\text{kernel2}, \frac{1}{r(fx-x_0, fy-y_0,)+1}\right) & \text{for } \text{abs}(fx-x_0) - \text{abs}(fy-y_0) = 0 \\ \text{filter}\left(\text{kernel1}, \frac{1}{r(fx-x_0, fy-y_0,)+1}\right) & \text{for } \text{abs}(fx-x_0) - \text{abs}(fy-y_0) < 0 \end{cases} \qquad (9)$$

For magenta:

$$f(fx, fy) = \begin{cases} \text{filter}\left(\text{kernel3}, \frac{1}{r(fx-x_0, fy-y_0,)+1}\right) & \text{for } \text{abs}(fx-x_0) - \text{abs}(fy-y_0) > 0 \\ \text{filter}\left(\text{kernel2}, \frac{1}{r(fx-x_0, fy-y_0,)+1}\right) & \text{for } \text{abs}(fx-x_0) - \text{abs}(fy-y_0) = 0 \\ \text{filter}\left(\text{kernel1}, \frac{1}{r(fx-x_0, fy-y_0,)+1}\right) & \text{for } \text{abs}(fx-x_0) - \text{abs}(fy-y_0) < 0 \end{cases} \qquad (10)$$

For yellow:

$$f(fx, fy) = \begin{cases} \text{filter}\left(\text{kernel3}, \frac{1}{r(fx-x_0, fy-y_0,)+1}\right) & \text{for } \text{abs}(fx-x_0) - \text{abs}(fy-y_0) > 0 \\ \text{filter}\left(\text{kernel2}, \frac{1}{r(fx-x_0, fy-y_0,)+1}\right) & \text{for } \text{abs}(fx-x_0) - \text{abs}(fy-y_0) = 0 \\ \text{filter}\left(\text{kernel1}, \frac{1}{r(fx-x_0, fy-y_0,)+1}\right) & \text{for } \text{abs}(fx-x_0) - \text{abs}(fy-y_0) < 0 \end{cases} \qquad (11)$$

For black:

$$f(fx, fy) = \begin{cases} \text{filter}\left(\text{kernel3}, \frac{1}{r(fx-x_0, fy-y_0,)+1}\right) & \text{for } \text{abs}(fx-x_0) - \text{abs}(fy-y_0) > 0 \\ \text{filter}\left(\text{kernel2}, \frac{1}{r(fx-x_0, fy-y_0,)+1}\right) & \text{for } \text{abs}(fx-x_0) - \text{abs}(fy-y_0) = 0 \\ \text{filter}\left(\text{kernel1}, \frac{1}{r(fx-x_0, fy-y_0,)+1}\right) & \text{for } \text{abs}(fx-x_0) - \text{abs}(fy-y_0) < 0 \end{cases} \qquad (12)$$

In equation (8), $(x_0, y_0)$ represents the center position of the filter, and $x_0 = Sfx/2$ and $y_0 = Sfy/2$. The filter function in each of equations (9) to (12) represents a two-dimensional convolution filter. In the first filter processing indicated by the kernel, two-dimensional convolution filter processing based on a kernel coefficient is performed at each position $(f_x, f_y)$ of the filter. The kernel is, for example, a Gaussian filter having a size of 5×5 or 9×9. By setting the kernel sizes to satisfy kernel1<kernel2<kernel3, the frequency characteristic of the arranged dots has an anisotropy. In this embodiment, kernel1 has a size of 1×1 (no filter), kernel2 has a size of 5×5, and kernel3 has a size of 9×9. Thus, using the characteristic in which the frequency band of the blue noise characteristic is shifted to the high frequency side as the kernel size is smaller and to the low frequency side as the kernel size is larger, it is possible to collect power in the direction of the low frequency side on which restriction on the dot arrangement is small. For example, in the case of cyan, the peak appears in a direction of 45° in the power spectrum by using kernel1 in the first quadrant and the third quadrant of the filter by equation (9). As indicated by conditional expressions in equations (9) to (12), by setting a condition with an allowance of an angle for each quadrant instead of setting a condition of a specific angle, it is possible to collect power around a specific frequency/deviation angle in the frequency domain without excessively concentrating on the specific frequency/deviation angle. The second filter processing is filter processing using a coefficient concerning the reciprocal of the distance r from the center portion of the filter, and details and the effect of the processing are as described in the first embodiment.

(Characteristic of Generated Dot Pattern)

Figure 9:
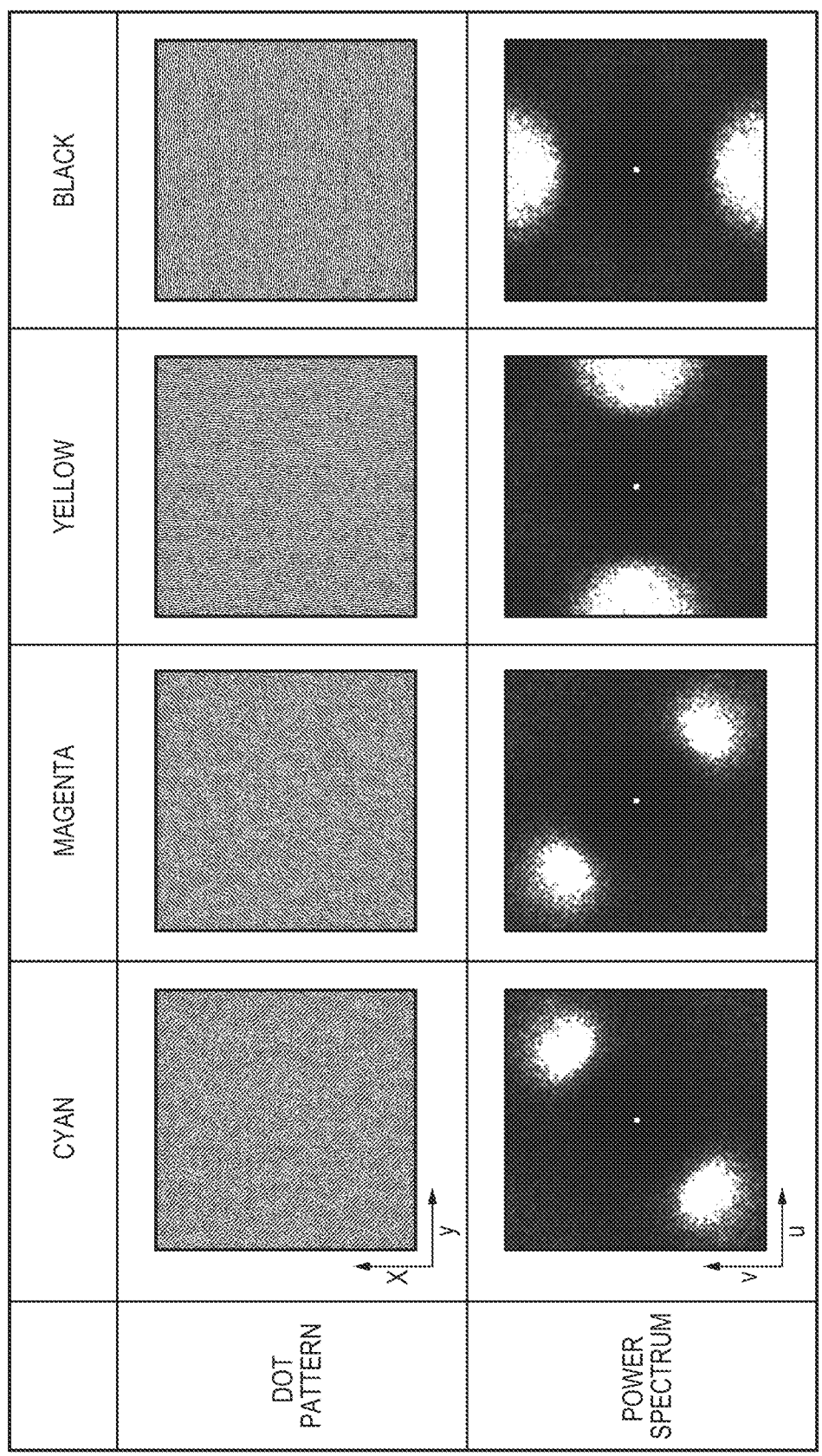
FIG. 9 is a view for explaining dot patterns according to the second embodiment.

FIG. 9 shows dot patterns generated using the dither matrices generated by the procedure described in the second embodiment and the power spectra of the dot patterns. It can be confirmed that the power spectra in the lower portion of FIG. 9 have the blue noise characteristic in which low frequency components are suppressed, and have a peak at 45° for C, a peak at 135° for M, a peak at 0° (180°) for Y, and a peak at 90° for K. As compared with FIG. 8, the peaks are distributed, and it is thus possible to collect more power at a predetermined frequency/deviation angle and around it.

(Characteristic of Power Spectrum)

The characteristics of the power spectra of the dot patterns generated in the first and second embodiments will be described by comparison with the conventional examples of the AM method and the FM method.

Figure 10:
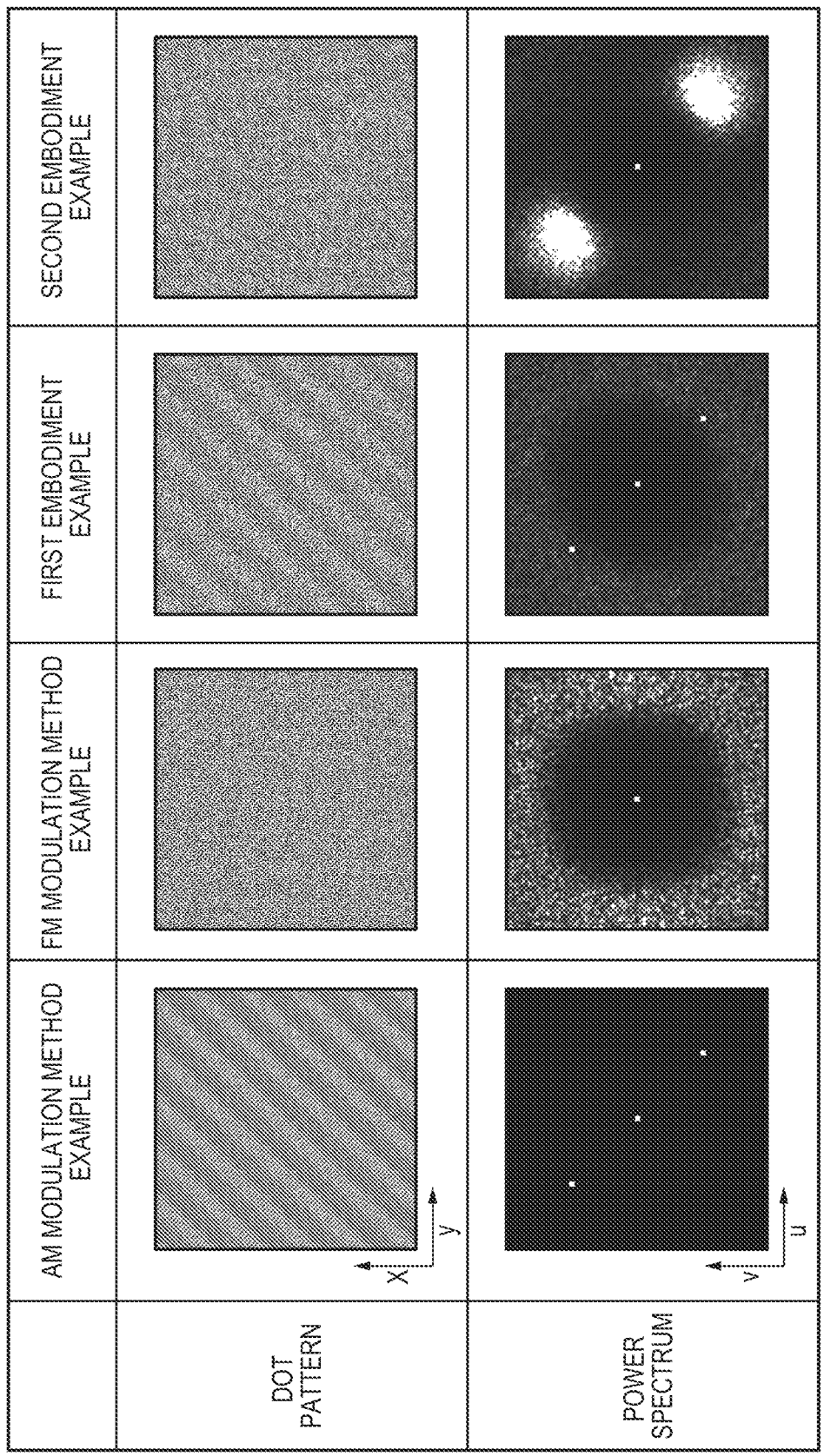
FIG. 10 is a view for comparing the characteristics of dot patterns of the first and second embodiments.

FIG. 10 shows dot patterns and power spectra obtained by performing two-dimensional Fourier transform for the patterns with respect to a general example of the AM method, a general example of the FM method, an example of magenta of the first embodiment, and an example of magenta of the second embodiment. As described above, it can also be confirmed from FIG. 10 that the dot patterns of the first and second embodiments have the characteristics of the AM method and the FM method.

Referring to the lower portion of FIG. 10, if a coordinate position obtained by setting the origin of the frequency domain as a center is represented by (u, v), the frequency component of the power spectrum can be represented by F(u, v). In this case, if a frequency r and a deviation angle θ are defined by equations (13) below, the frequency component of the power spectrum can also be represented as polar coordinates (circular coordinates) F(r, θ). Note that π represents the circle ratio and arctan represents a function of obtaining the value of an arc tangent. The frequency r and the deviation angle θ can finely be calculated based on the position (u, v) of the power spectrum. However, for example, frequencies and deviation angles falling within certain ranges are processed as the same frequency and the same deviation angle, respectively, by rounding off a fractional part.

$$\text{frequency } r = (u^2 + v^2)^{\frac{1}{2}} \bigg/ \left(\frac{25.4}{RES}\right) \bigg/ N \quad (13)$$

$$\text{deviation angle } \theta = \begin{cases} \arctan\left(\frac{u}{v}\right) \times \frac{180}{\pi} & \text{for } v \neq 0 \\ 90 & \text{for } v = 0 \end{cases}$$

At this time, a value obtained by averaging powers of the same frequency r with respect to the polar coordinates F(r, θ) of the power spectrum is set as a radially averaged power spectrum RAPS for each frequency. RAPS is given by equation (14) where n represents the number of pixels with the same frequency r among the frequency components F(u, v).

$$RAPS(r) = \frac{1}{n} \sum_\theta F(r, \theta) \quad (14)$$

A value obtained by averaging powers of the same deviation angle θ with respect to the polar coordinates F(r, θ) is set as a frequency averaged power spectrum FAPS for each angle. FAPS is given by equation (15) where m represents the number of pixels with the same deviation angle θ among the frequency components F(u, v).

$$FAPS(\theta) = \frac{1}{m} \sum_r F(r, \theta) \quad (15)$$

Note that conversion into the polar coordinates F(r, θ) is for the sake of description. In fact, the frequency r and the deviation angle θ of each coordinate position (u, v) can be obtained from the rectangular coordinates F(u, v) to directly calculate RAPS and FAPS. Furthermore, since the power spectrum is point-symmetrical with respect to the origin, the characteristic within the range of θ=0° to 180° will be described below.

Figure 11:
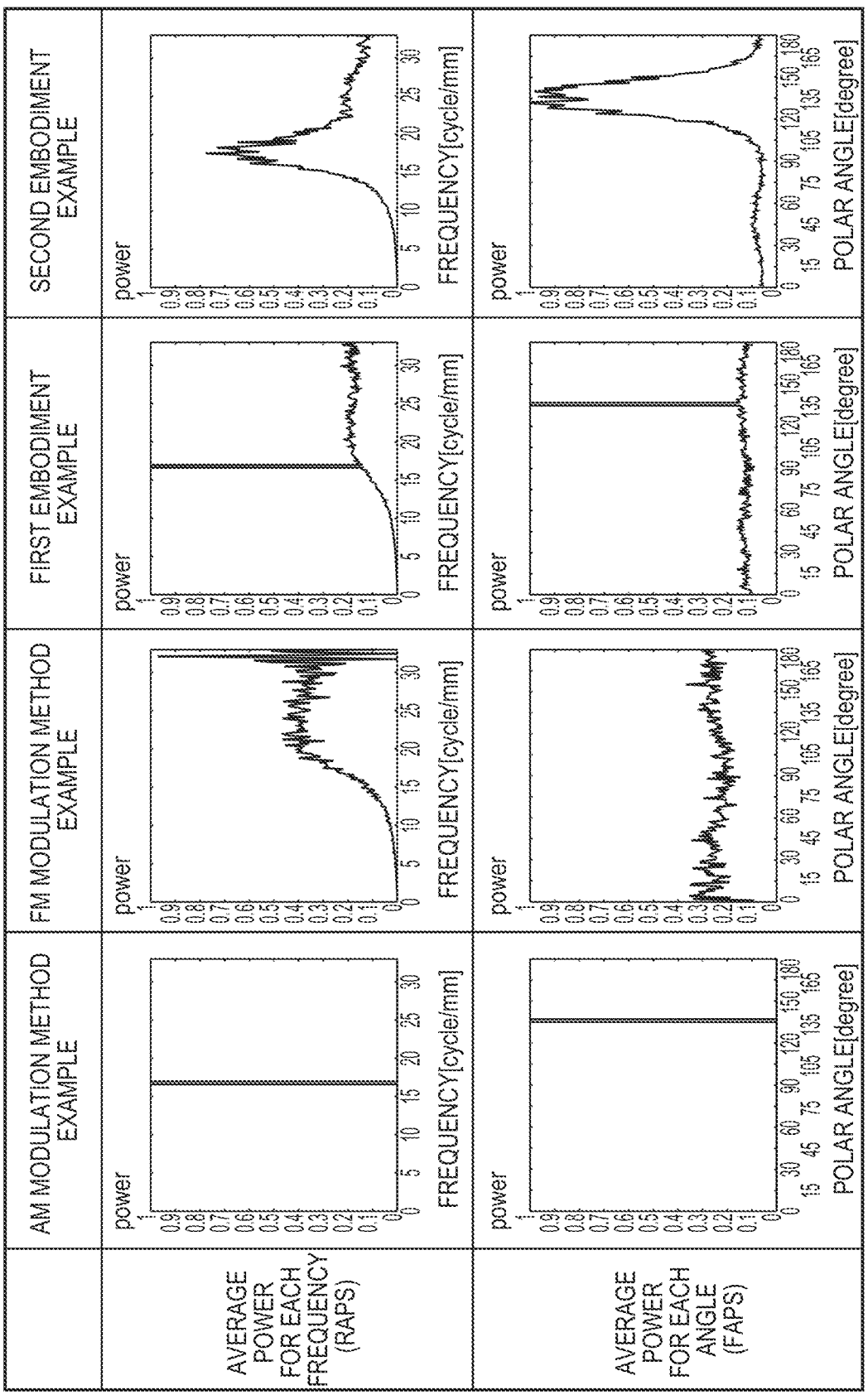
FIG. 11 is a view showing RAPS and FAPS obtained from the power spectra shown in FIG. 10.

FIG. 11 shows RAPS and FAPS calculated from each of the power spectra in the lower portion of FIG. 10. As shown in FIG. 11, in the example of the AM method, power is modulated into a predetermined frequency (17 cycles/mm) and a predetermined deviation angle)(135°). In the example of the FM method, it is found that the blue noise (green noise) characteristic is obtained, in which there is no peak in the angle direction, power in the low frequency band is suppressed, and power is modulated into the high frequency band. On the other hand, in the example of the first embodiment, the blue noise (green noise) characteristic is obtained, in which while there is a peak at the predetermined frequency (17 cycles/mm) and the predetermined deviation angle (135°), power in the low frequency band is suppressed and power is modulated into the high frequency band. As compared with the conventional FM method, it is found that while power in the high frequency band is suppressed, power is concentrated on the specific frequency and deviation angle. Similarly, in the example of the second embodiment as well, the blue noise (green noise) characteristic is obtained, in which while there is a peak at the predetermined frequency (17 cycles/mm) and the predetermined deviation angle (135°), power in the low frequency band is suppressed and power is modulated into the high frequency band. In addition, in the example of the second embodiment, it can be confirmed that the peak is spread, as compared with the example of the first embodiment. By making the peak spread in this way, more power in the high frequency band is suppressed, and power is concentrated in a specific frequency band and deviation angle range.

Figure 12:
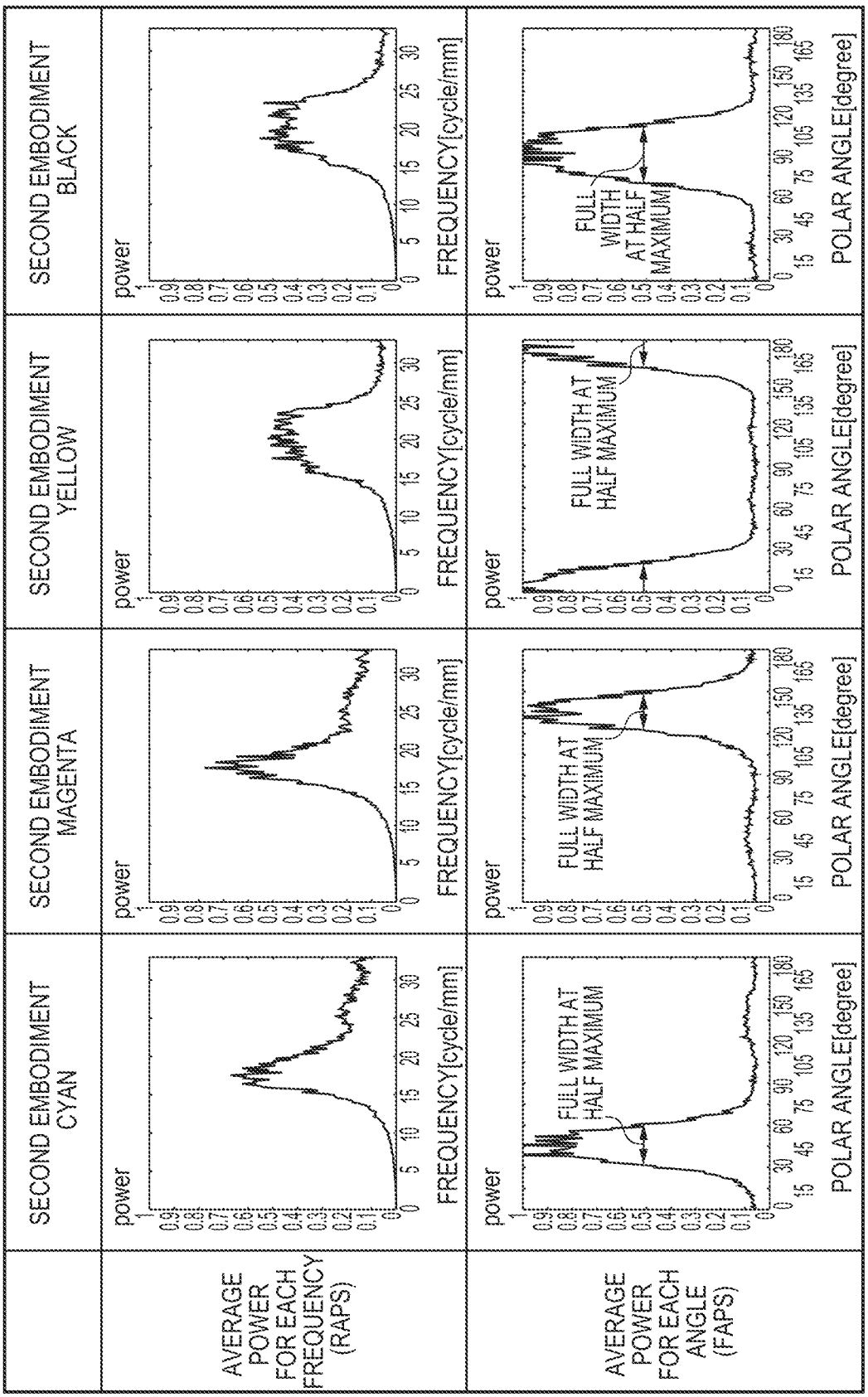
FIG. 12 is a view showing RAPS and FAPS obtained from the power spectra shown in FIG. 9.

The relationship between the colors in the second embodiment will be described next with reference to FIG. 12. FIG. 12 shows RAPS and FAPS calculated from each of the power spectra in the lower portion of FIG. 9. In the frequency averaged power spectrum (FAPS) for each angle, it is desirable that power other than the peak is suppressed to power smaller than the half value of the power (maximum value) at the peak. With respect to the spread of the peak, if the width of the half value of the power (maximum value) at the peak is set as the full width at half maximum, the full width at half maximum of 45°, obtained by dividing 180° by 4, or less is desirable in a case where assignment is performed for four colors. In a case where assignment is performed for three colors, the full width at half maximum of 60°, obtained by dividing 180° by 3, or less is desirable. In a case where assignment is performed for two colors, the full width at half maximum 90°, obtained by dividing 180° by 2, or less is desirable. It is preferable to assign, to the respective colors, the deviation angles of the peaks within the range of 0° to 180° so the deviation angle regions of the full widths at half maximum of the peaks do not overlap each other. Note that the full width at half maximum may directly be calculated from the shape of FAPS or may be calculated by approximating FPAS to a continuous function such as a Gaussian function.

Furthermore, blue noise patterns having peaks at deviation angles separated from each other by a predetermined value or more may be used for only two colors (for example, cyan and magenta) that are significantly influenced by overlapping of the colors, and normal blue noise patterns or the like may be used for yellow and black. In the embodiment, overlapping of dot patterns between different colors has been described. However, it is possible to obtain the same effect even for dot patterns for respective scans when forming an image by a plurality of scans using ink of the same color.

Third Embodiment

In each of the first and second embodiments, an example of generating a dither matrix M in which values of 1 to 65536 are stored by repeatedly adding a dot from 1 to 65536 has been explained. The third embodiment will describe an example of generating a dither matrix by generating an initial dot pattern of a halftone and adding and deleting dots to and from the initial dot pattern.

Figure 13:
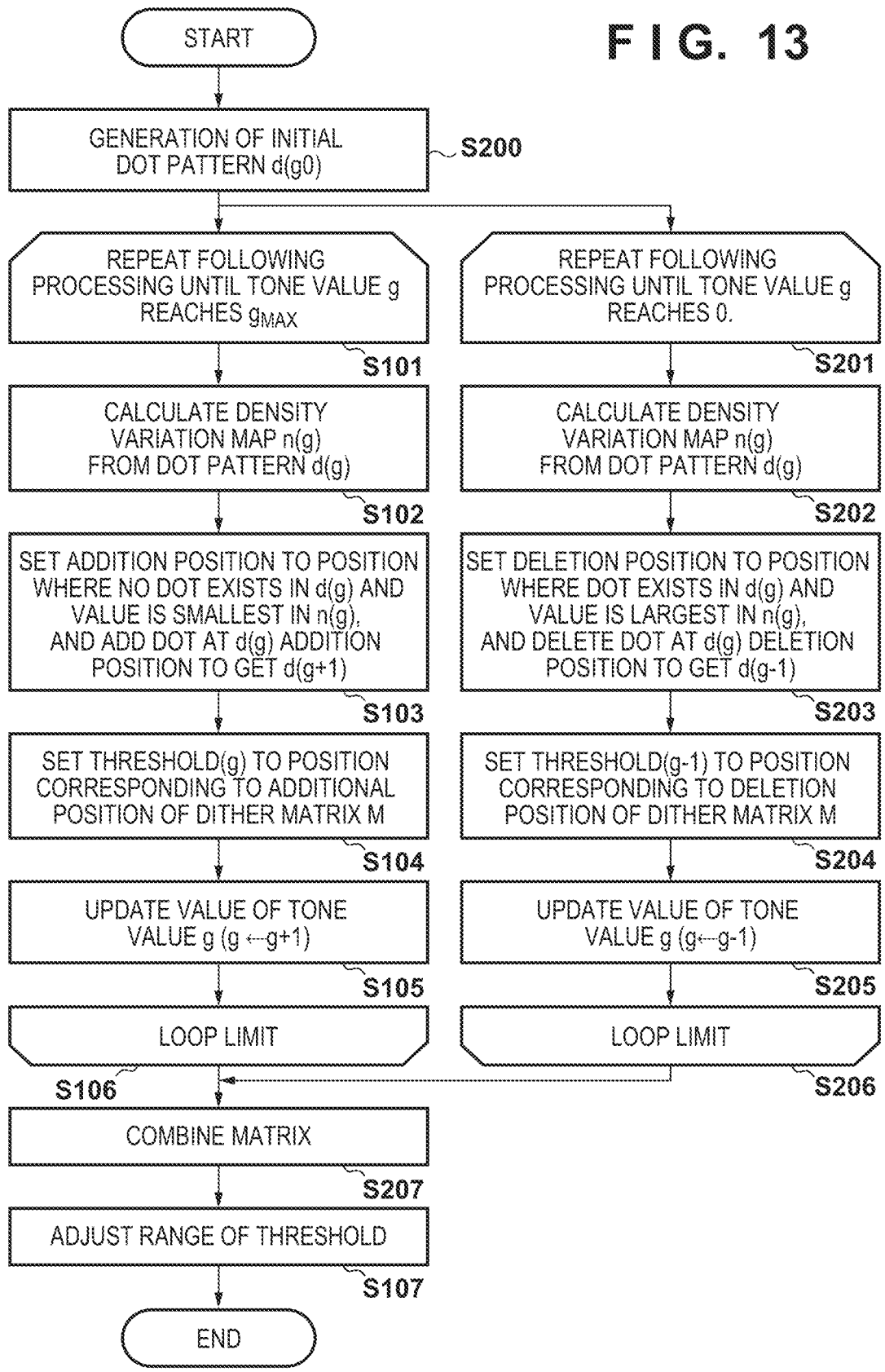
FIG. 13 is a flowchart for explaining dither matrix generation processing according to another embodiment.

A dither matrix generation method according to this embodiment will be described in detail below with reference to FIG. 13. Processes in steps S101 to S107 are the same processes as in the flowchart of FIG. 7 except that an initial tone is $g_0$.

In step S200, an initial dot pattern $d(g_0)$ when a tone value g is $g_0$ is generated. In this case, initial dot patterns that have a blue noise characteristic in which low frequency components are suppressed and have the dispersed deviation angles of the peaks of the respective colors are generated for four colors of C, M, Y, and K. In this example, the deviation angles of the peaks of C, M, Y, and K are 135°, 45°, 0° (180°), and 90°, respectively. For example, the initial dot pattern can be obtained by repeatedly rearranging a dot arrangement so that a power spectrum is calculated by performing discrete Fourier transform for the dot pattern, and is multiplied by an evaluation filter that gives an arbitrary frequency characteristic, and the total value of powers is smallest. Alternatively, a dot pattern of a halftone is generated based on the method of the first or second embodiment, and is used as the initial dot pattern.

In steps S201 to S206, processing of deleting a dot from the dot pattern is repeated. Steps S201 and S206 are loop limits, and indicate that processes in steps S202 to S205 are repeated until the tone value g reaches 0 from $g_0$. The processes in steps S202 to S205 correspond to processing of deleting one dot from a dot pattern of a tone value g+1 to generate a dot pattern of the adjacent tone, that is, the tone value g, and a corresponding dither matrix.

A threshold matrix generation apparatus 301 applies a low-pass filter to the dot pattern d(g) corresponding to the tone value g, and adds it to an initial density variation map n(0), thereby calculating a density variation map n(g) (step S202). In this embodiment, as the low-pass filter used in step S202, the filter given by equations (6) or equations (9) to (12) can be used. The threshold matrix generation apparatus 301 deletes, among dots in the ON state in the dot pattern d(g), a dot d(g, $x_{MAX}$, $y_{MAX}$) corresponding to a position ($x_{MAX}$, $y_{MAX}$) where the value is largest in the density variation map n(g) (step S203). A dot pattern obtained by deleting the dot in the ON state from the dot pattern d(g) is represented by d(g−1). The threshold matrix generation apparatus 301 sets the tone value g−1 as the value in a dither matrix M(x, y) corresponding to the position ($x_{MAX}$, $y_{MAX}$) where the dot has been deleted (step S204). The threshold matrix generation apparatus 301 decrements the tone value g to obtain g−1 (step S205). In step S207, the threshold matrix generation apparatus 301 combines the dither matrices generated in steps S101 to S106 with the dither matrices generated in steps S201 to S206, thereby obtaining one dither matrix corresponding to all tones.

As described above, the initial dot pattern $d(g_0)$ with an arbitrary power spectrum is generated, a dot is repeatedly added from $g_0$ to $g_{MAX}$, and a dot is repeatedly deleted from $g_0$ to 0, thereby generating a dither matrix. That is, a dot pattern is generated by changing the tone value from a predetermined tone value ($g_0$) in ascending order and descending order, thereby generating a dither matrix. This can generate at least a dither matrix having a desired frequency characteristic in the initial dot pattern $d(g_0)$. Furthermore, restriction on a dot arrangement is reduced in a highlight tone and shadow tone, thereby making it possible to obtain a dot arrangement with a highly dispersible blue noise characteristic.

Modification

Each of the first and second embodiments has explained an example of generating a dot pattern represented by two values of ON and OFF of a dot in the quantization processing unit 106. The present invention, however, is not limited to this. Even if a dot pattern represented by three or more values is generated, the effect by the technique of this disclosure can be obtained. For example, an input image is divided into a plurality of data (for example, dark dot data and light dot data), quantization processing is performed for the plurality of data using the same threshold matrix, and a quantization results are added, thereby obtaining a quantization result of three or more values. In this case as well, it is possible to generate a dot pattern that has the blue noise characteristic or the green noise characteristic in which low frequency components are suppressed in a power spectrum and has a peak at a predetermined deviation angle.

As described above, according to each embodiment, it is possible to suppress occurrence of moiré, graininess, and the like caused by overlapping of dots of a plurality of colors at the time of forming an image on a recording medium by the dots of the plurality of colors.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-107356, filed Jul. 1, 2022, which is hereby incorporated by reference herein in its entirety.

What is claimed is:

1. An image processing apparatus comprising:
an input unit configured to input a plurality of multi-valued data corresponding to a plurality of color materials; and
a quantization unit configured to quantize each of the plurality of multi-valued data and generate a plurality of quantization data each indicating recording or non-recording of a dot on a recording medium by each of the plurality of color materials,
wherein a plurality of dot patterns of the plurality of color materials recorded based on the plurality of quantization data generated by the quantization unit have peaks at different deviation angles in power spectra in a frequency domain and have a blue noise characteristic or a green noise characteristic, and
wherein
in a case where, in polar coordinates $F(r, \theta)$ of the power spectrum in the frequency domain of each of the plurality of dot patterns, an average of powers at a frequency r is represented by a radially averaged power spectrum RAPS(r) for each frequency and an average of powers at a deviation angle $\theta$ falling within a range of 0° to 180° is represented by a frequency averaged power spectrum FAPS($\theta$) for each angle,
RAPS(r) of each of the plurality of dot patterns has the blue noise characteristic or the green noise characteristic, and has a peak in a band corresponding to the peak at the deviation angle, and FAPS($\theta$) of each of the plurality of dot patterns has the blue noise characteristic or the green noise characteristic, and has a peak at the deviation angle.

2. The apparatus according to claim 1, wherein the deviation angles of the plurality of dot patterns fall within a range of 0° to 180°.

3. The apparatus according to claim 2, wherein in a case where the plurality of color materials include n colors, the deviation angles of the plurality of dot patterns are different from each other by 180°/n.

4. The apparatus according to claim 1, wherein deviation angle regions as full widths at half maximum of the peaks in FAPS($\theta$) of the plurality of dot patterns do not overlap each other.

5. The apparatus according to claim 1, wherein the quantization unit includes a plurality of threshold matrices corresponding to the plurality of color materials, and generates quantization data by comparing each of the plurality of multi-valued data with a threshold of the threshold matrix of the corresponding color material.

6. A recording apparatus comprising:
an image processing apparatus defined in claim 1; and
a recording unit configured to record each of a plurality of color materials on a recording medium in accordance with a plurality of quantization data.

7. An image processing method comprising:
inputting a plurality of multi-valued data corresponding to a plurality of color materials; and
quantizing each of the plurality of multi-valued data and generating a plurality of quantization data each indicating recording or non-recording of a dot on a recording medium by each of the plurality of color materials,
wherein a plurality of dot patterns of the plurality of color materials recorded based on the plurality of quantization data generated in the quantizing have peaks at different deviation angles in power spectra in a frequency domain and have a blue noise characteristic or a green noise characteristic, and
wherein
in a case where, in polar coordinates $F(r, \theta)$ of the power spectrum in the frequency domain of each of the plurality of dot patterns, an average of powers at a frequency r is represented by a radially averaged power spectrum RAPS(r) for each frequency and an average of powers at a deviation angle $\theta$ falling within a range of 0° to 180° is represented by a frequency averaged power spectrum FAPS($\theta$) for each angle,
RAPS(r) of each of the plurality of dot patterns has the blue noise characteristic or the green noise characteristic, and has a peak in a band corresponding to the peak at the deviation angle, and FAPS($\theta$) of each of the plurality of dot patterns has the blue noise characteristic or the green noise characteristic, and has a peak at the deviation angle.

8. A non-transitory computer-readable storage medium storing a program for causing a computer to execute an image processing method, the method comprising:
inputting a plurality of multi-valued data corresponding to a plurality of color materials; and
quantizing each of the plurality of multi-valued data and generating a plurality of quantization data each indicating recording or non-recording of a dot on a recording medium by each of the plurality of color materials,
wherein a plurality of dot patterns of the plurality of color materials recorded based on the plurality of quantization data generated in the quantizing have peaks at different deviation angles in power spectra in a frequency domain and have a blue noise characteristic or a green noise characteristic, and
wherein
in a case where, in polar coordinates $F(r, \theta)$ of the power spectrum in the frequency domain of each of the plurality of dot patterns, an average of powers at a frequency r is represented by a radially averaged power spectrum RAPS(r) for each frequency and an average of powers at a deviation angle $\theta$ falling within a range of 0° to 180° is represented by a frequency averaged power spectrum FAPS($\theta$) for each angle,
RAPS(r) of each of the plurality of dot patterns has the blue noise characteristic or the green noise characteristic, and has a peak in a band corresponding to the peak at the deviation angle, and FAPS($\theta$) of each of the plurality of dot patterns has the blue noise characteristic or the green noise characteristic, and has a peak at the deviation angle.

* * * * *